United States Patent
Noll et al.

(10) Patent No.: US 10,718,909 B2
(45) Date of Patent: Jul. 21, 2020

(54) EXPANDED BEAM FIBER OPTIC CONNECTION SYSTEM

(75) Inventors: Gregory B. Noll, Burbank, CA (US); Monish J. Doshi, Irvine, CA (US); Deniz K. Armani, Pasadena, CA (US); Jonathon M. Smith, Santa Monica, CA (US)

(73) Assignee: GLENAIR, INC., Glendale, CA (US)

( * ) Notice: Subject to any disclaimer, the term of this patent is extended or adjusted under 35 U.S.C. 154(b) by 0 days.

(21) Appl. No.: 12/511,683

(22) Filed: Jul. 29, 2009

(65) Prior Publication Data
US 2010/0027943 A1 Feb. 4, 2010

Related U.S. Application Data

(60) Provisional application No. 61/084,387, filed on Jul. 29, 2008.

(51) Int. Cl.
*G02B 6/38* (2006.01)
*B01L 3/00* (2006.01)
*B01L 7/00* (2006.01)

(52) U.S. Cl.
CPC ...... *G02B 6/3845* (2013.01); *B01L 3/502715* (2013.01); *B01L 3/502753* (2013.01);
(Continued)

(58) Field of Classification Search
CPC ............. G02B 6/3853; G02B 6/3821
See application file for complete search history.

(56) References Cited

U.S. PATENT DOCUMENTS 4,290,667 A * 9/1981 Chown ............................ 385/33
4,753,510 A * 6/1988 Sezerman ....................... 385/61
(Continued)

FOREIGN PATENT DOCUMENTS

WO WO2009005298 1/2009
WO WO2006040126 2/2009

OTHER PUBLICATIONS

Int'l Search Report dated Jul. 6, 2010.
Bryan "Fiber Optic Connector Having Hermaphroditic Coupling Mechanism", Abstract of US 2009060420.

*Primary Examiner* — Sung H Park
*Assistant Examiner* — Hoang Q Tran
(74) *Attorney, Agent, or Firm* — Clark Hill PLC; John S. Paniaguas

(57) ABSTRACT

An expanded beam fiber optic connection system is disclosed which overcomes the problems associated with known expanded beam fiber optic connection systems. In particular, the expanded beam fiber optic connection system in accordance with the present invention includes a pair of mating fiber optic connectors. Each fiber optic connector includes a connector body and fiber optic termini. In accordance with an important aspect of the invention, the fiber optic termini utilize expanded beam technology and are configured with virtually the same form factor as existing physical contact fiber optic termini. The configuration of the expanded beam termini provides several benefits. First, existing physical contact fiber optic connection systems can be updated in the field by simply replacing the existing physical contact fiber optic termini with the new expanded beam fiber optic termini in accordance with the present invention and re-using the existing connector body, thus significantly reducing cost of upgrading existing physical contact type fiber optic connection systems. Secondly, since the same connector bodies are used for both the physical contact termini and the expanded beam termini, the number of components for the two types of fiber optic connection systems is reduced, thus reducing manufacturing costs.

9 Claims, 18 Drawing Sheets

(52) U.S. Cl.
CPC ......... *B01L 3/5029* (2013.01); *B01L 3/50825* (2013.01); *B01L 7/52* (2013.01); *B01L 2200/027* (2013.01); *B01L 2200/16* (2013.01); *B01L 2300/087* (2013.01); *B01L 2300/0816* (2013.01); *B01L 2300/0867* (2013.01); *B01L 2300/0887* (2013.01); *B01L 2400/0487* (2013.01); *G02B 6/3821* (2013.01); *G02B 6/3825* (2013.01); *G02B 6/3853* (2013.01); *G02B 6/3878* (2013.01); *G02B 6/3887* (2013.01)

(56) References Cited

U.S. PATENT DOCUMENTS

| | | | |
|---|---|---|---|
| 4,822,129 A | | 4/1989 | Webb |
| 4,889,406 A | * | 12/1989 | Sezerman ................ 385/35 |
| 4,925,267 A | | 5/1990 | Plummer et al. |
| 4,936,662 A | | 6/1990 | Griffin |
| 4,989,943 A | * | 2/1991 | Yoshinaga ........... G02B 6/4204 250/227.11 |
| 5,097,524 A | | 3/1992 | Wasserman et al. |
| 5,243,673 A | | 9/1993 | Johnson et al. |
| 5,481,634 A | | 1/1996 | Anderson et al. |
| 5,608,828 A | | 3/1997 | Coutts et al. |
| 6,234,683 B1 | | 5/2001 | Waldron et al. |
| 6,632,025 B2 | | 10/2003 | Ukrainczyk |
| 6,655,850 B2 | | 12/2003 | Mann et al. |
| 7,331,718 B2 | | 2/2008 | Yazaki et al. |
| 7,455,460 B2 | | 11/2008 | Pimpinella |
| 7,460,750 B2 | | 12/2008 | Durrant et al. |
| 2008/0050072 A1 | | 2/2008 | Durrant et al. |
| 2008/0050073 A1 | | 2/2008 | Kadar-Kallen et al. |
| 2008/0089650 A1 | | 4/2008 | Legler et al. |
| 2008/0279509 A1 | | 11/2008 | Durrant et al. |

* cited by examiner

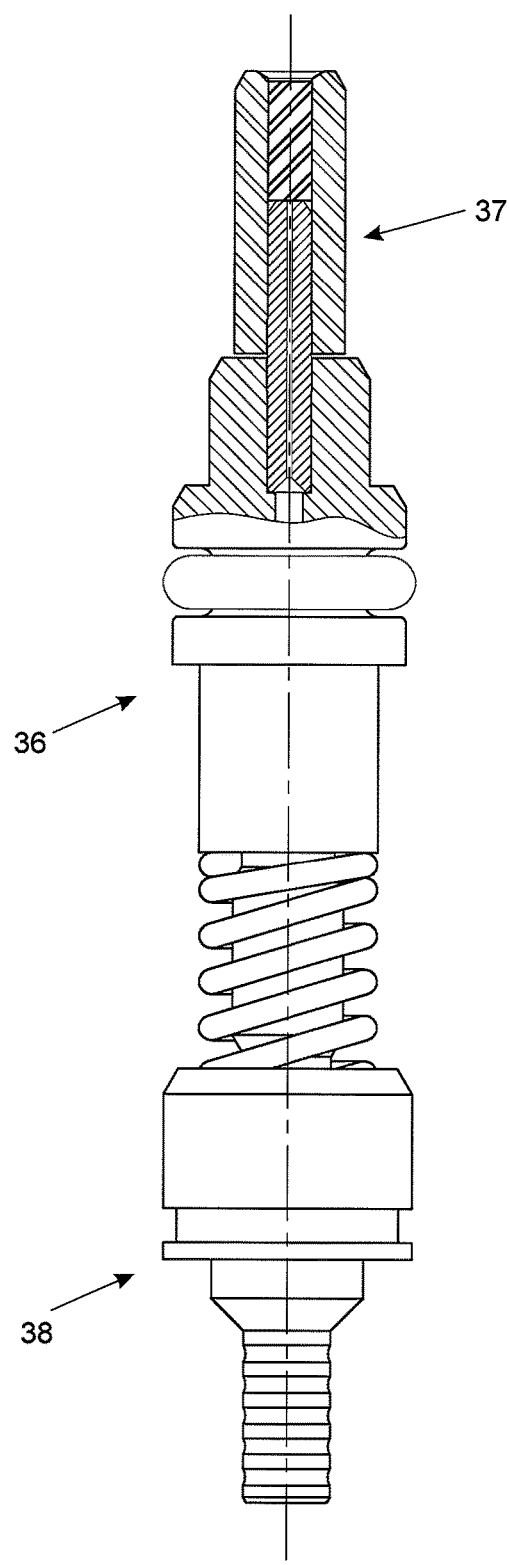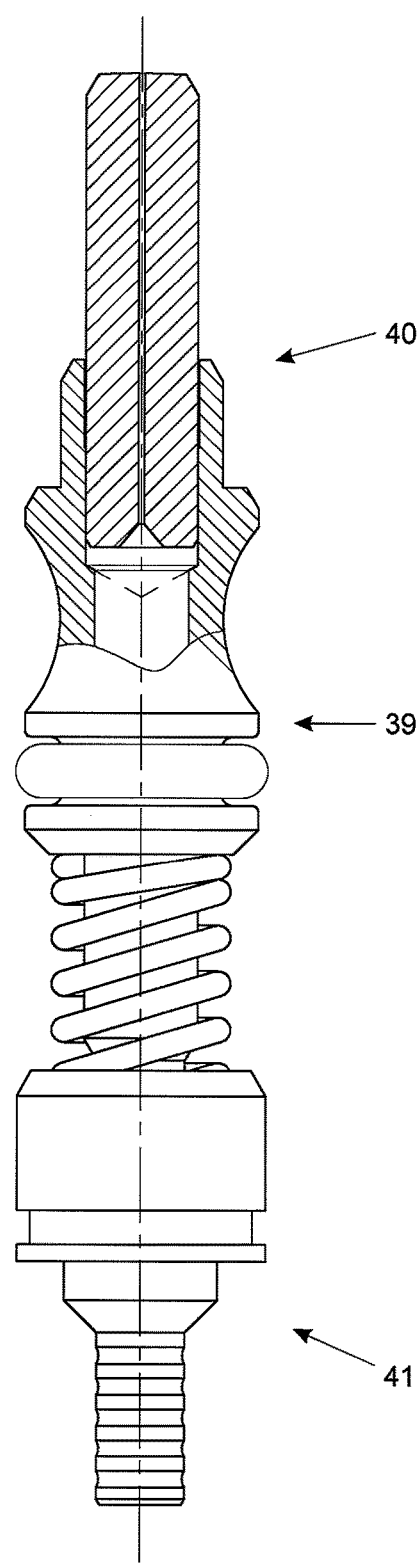
FIG. 14A  FIG. 14B

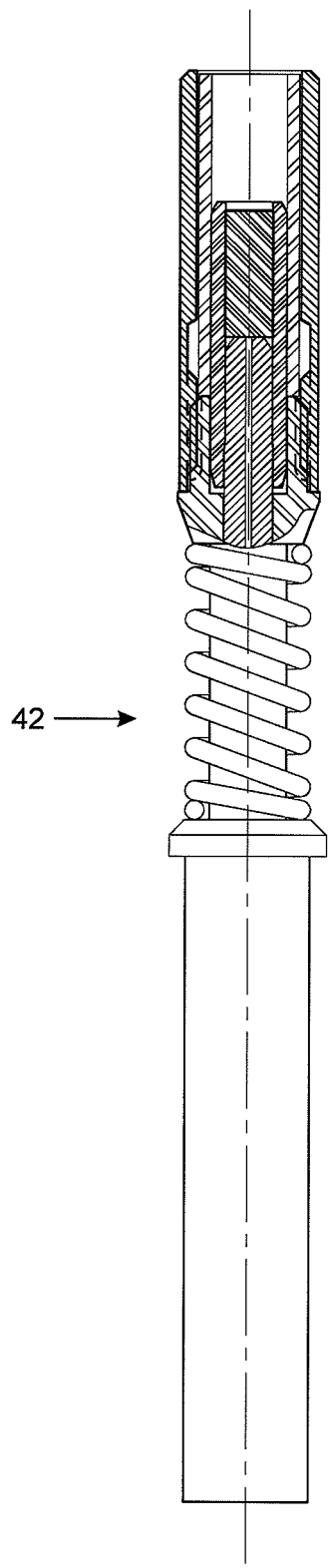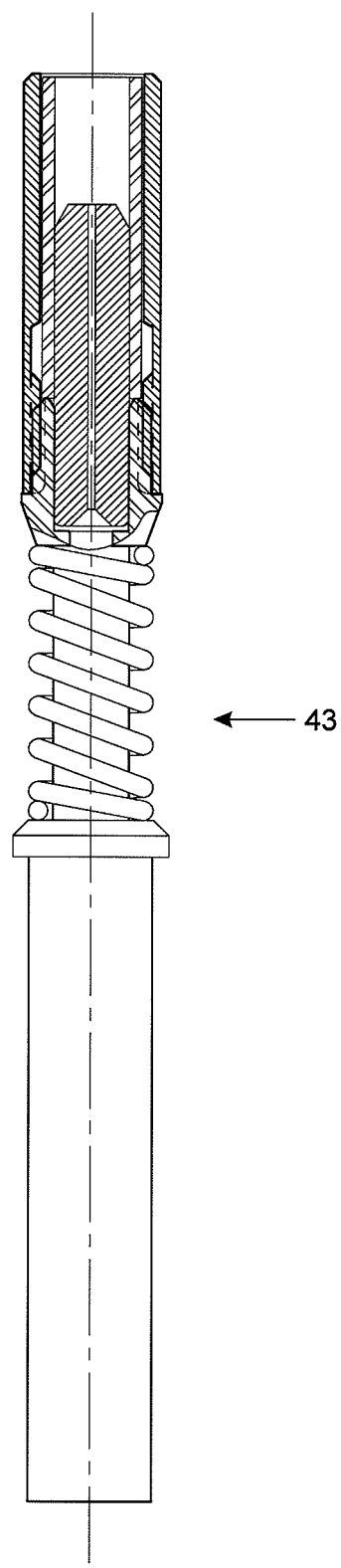
FIG. 15A  FIG. 15B

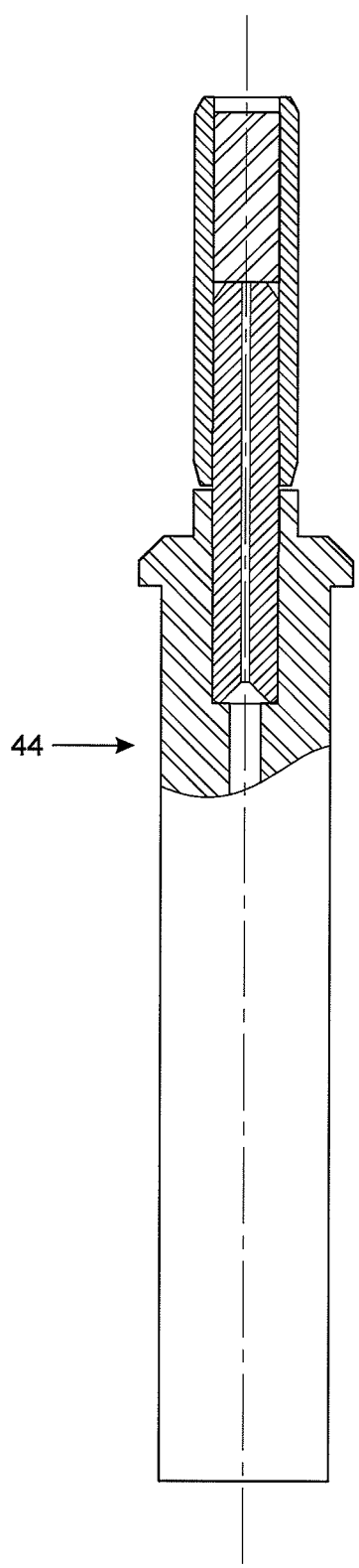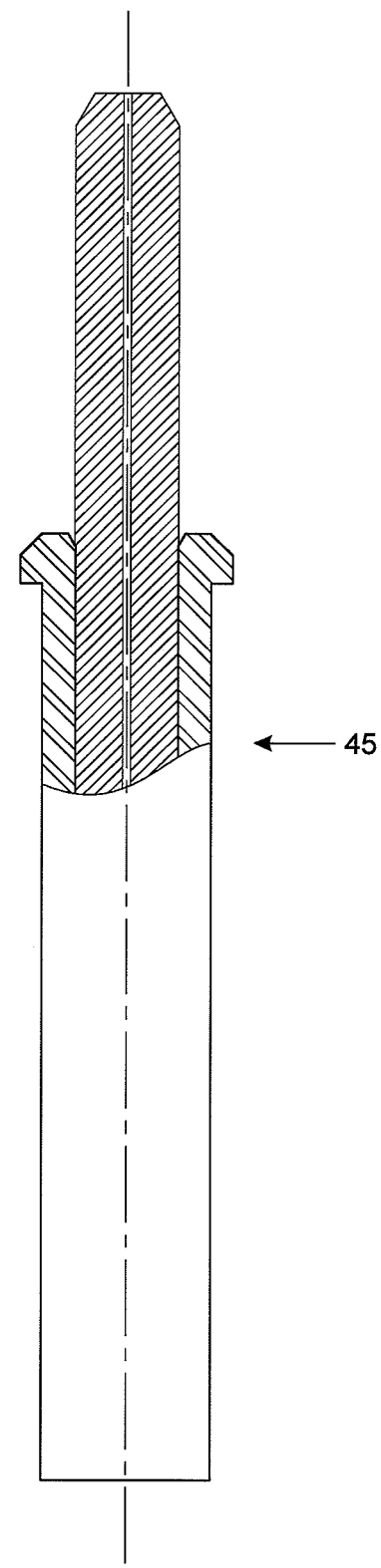
FIG. 16A  FIG. 16B

EXPANDED BEAM FIBER OPTIC CONNECTION SYSTEM

CROSS REFERENCE TO RELATED APPLICATIONS

This application claims priority to and the benefit of U.S. Provisional Patent Application No. 61/084,387, filed on Jul. 29, 2008, hereby incorporated by reference.

BACKGROUND OF THE INVENTION

1. Field of the Invention

The present invention relates to a fiber optic connection system for interconnecting optical fibers and more particularly an expanded beam fiber optic connection system that incorporates expanded beam fiber optic termini, which can be formed with relatively the same form factor as conventional physical contact fiber optic termini, that can be used to form fiber optic plugs, fiber optic receptacles and genderless, i.e. hermaphroditic connectors, as well as replace conventional physical contact fiber optic termini in existing connectors in the field in order to convert existing connectors with such conventional fiber optic termini to expanded beam technology.

2. Description of the Prior Art

Fiber optic systems are used in many applications to transmit analog and digital data signals. For example, fiber optic systems are used in high-speed data communications and telecommunications, in part, because of their insensitivity to electromagnetic interference. Because of the relatively small size, light weight and immunity to electromagnetic interference, fiber optic systems are known to be used in various applications including industrial, automotive, avionics, shipboard, commercial broadcast, and ground tactical field deployment applications.

Fiber optic connection systems are known to interconnect optical fibers. Various types of fiber optic connection systems are known in the art. In particular, both physical contact and expanded beam fiber optic connectors are known. In both types of fiber optic connection systems, interconnection of the optical fibers requires relatively precise axial, radial and angular alignment of the optical fibers to avoid reflection and refraction of the light in order to avoid errors and distortions of the optical output signals.

Examples of physical contact fiber optic connection systems are disclosed in U.S. Pat. Nos. 5,481,634, and 6,234,683. In such physical contact fiber optic connection systems, the optical fibers to be interconnected are juxtaposed to be in direct physical contact with each other.

Such physical contact fiber optic connection systems are the most common optical fiber interconnect system. These connection systems use relatively tight tolerance ferrules into which the optical fibers are inserted. In particular, the two mating ferrules are butt-coupled inside a tight tolerance sleeve to align the ferrules. In order to create a low optical loss connection, both the ferrule and sleeve must ideally be manufactured with tolerances of a few micrometers at most. This requirement for precision includes maintaining nearly perfect concentricity between the inner and outer diameters of the ferrule as well as nearly perfect concentricity between the mating ferrules by way of an aligning component, such as a sleeve.

While this method of optical fiber interconnect performs adequately, it has serious drawbacks in field deployment environments where contamination is a significant concern. This contamination sensitivity arises from the microscopic optically active region of optical fiber, commonly referred to as the "core". The core area commonly ranges from 62.5-micrometers diameter for multi-mode fiber to 9-micrometers diameter for single mode fiber. With such a minute transmission area, even microscopic airborne contaminants can easily obscure large sections of the core, significantly obstructing the optical path, resulting in signal loss. Moreover, since the ferrules are in contact with each other, contaminants on the surface of either could permanently damage and contaminate the fiber surface.

One method to reduce contamination sensitivity on fiber optic interconnects is to expand the cross-sectional area of the beam emerging from the fiber end-face. As such, expanded beam fiber optic connection systems have been developed. Examples of such expanded beam fiber optic interconnects are disclosed in U.S. Pat. Nos. 6,655,850; 6,632,025; 7,460,750 and US Patent Application Publication Nos. US 2008/0279509 A1 and US 2008/0050072 A1. With such expanded beam fiber optic interconnects, the beam from the transmitting optical fiber is expanded and then collimated by way of an optical lens. The receiving optical fiber is placed at the focal point of a second optical lens which causes the expanded and collimated beam to converge and enter the receiving optical fiber.

With such expanded beam fiber optic connection systems, once the beam is expanded, optical power density is reduced. Therefore, common airborne contaminants and debris no longer obstruct enough area of the beam to cause significant optical loss. Finally, if the beam is collimated once expanded, a relatively large gap can be accommodated between the two lenses. This gap prevents contaminants from damaging the exposed lens end-face surfaces.

As mentioned above, in various known expanded beam fiber optic connection systems, the beam is expanded using a lens. In some known expanded beam fiber optic interconnects, for example, as disclosed in US Patent Application Publication No. US 2008/0050073 A1, the ferrule and the lens are aligned inside the bore of a tight tolerance connector insert which may contain multiple bores to accommodate multiple fiber optic channels. Using alignment pins on mating connector inserts, the lenses are thus aligned.

This design suffers from major mechanical and optical problems. The mechanical issues arise from the inability to maintain micron-level tolerances across multiple cavities within the same connector insert. Also, the alignment pin feature contributes to tolerance stack-up degrading the optical performance.

Known fiber optic connection systems include mating fiber optic connectors, as well as mating fiber optic termini. Each fiber optic connector includes a connector body and a plurality of fiber optic termini. Based upon the various problems mentioned above, many known physical contact fiber optic connection systems are being replaced with expanded beam fiber optic connection systems. Because of the differences in the configuration of various known types of expanded beam fiber optic interconnects, both the fiber optic connector body and the various fiber optic termini are replaced even though there are no problems with the fiber optic connector body. As such, replacement of existing physical contact fiber optic connection systems with expanded beam fiber optic connection systems is relatively expensive.

Thus, there is a need for an expanded beam fiber optic interconnect which is a relatively less expensive replacement for existing physical contact fiber optic connection systems and overcomes the problems associated with known expanded beam fiber optic connection systems.

SUMMARY OF THE INVENTION

Briefly, the present invention relates to an expanded beam fiber optic connection system which overcomes the problems associated with known expanded beam fiber optic connection systems. In particular, the expanded beam fiber optic connection system in accordance with the present invention includes a pair of mating connectors. Each connector includes a connector body and a plurality of expanded beam fiber optic termini. In accordance with an important aspect of the invention, the expanded beam fiber optic termini are configured with virtually the same form factor as existing physical contact fiber optic termini. The configuration of the expanded beam termini provides several benefits. First, existing physical contact fiber optic connection systems can be updated in the field by simply replacing the existing physical contact fiber optic termini with the new expanded beam fiber optic termini in accordance with the present invention and re-using the existing connector body, thus significantly reducing cost of converting existing physical contact type fiber optic connection systems. Secondly, since the same connector bodies are used for both the physical contact termini and the expanded beam termini, the number of components required for converting to an expanded beam interconnect is reduced, thus reducing manufacturing costs.

DESCRIPTION OF THE DRAWING

These and other advantages of the present invention will be readily understood with reference to the following specification and attached drawing wherein:

FIG. 14A is an elevational view of a genderless expanded beam fiber optic terminus in accordance with the present invention configured with the same form factor as the genderless physical contact type terminus illustrated in FIG. 14B.

FIG. 14B is an elevational view of a genderless physical contact type terminus.

FIG. 15A is an elevational view of a socket type expanded beam fiber optic terminus in accordance with the present invention configured with the same form factor as the socket type physical contact terminus illustrated in FIG. 15B.

FIG. 15B is an elevational view of a socket type physical contact terminus.

FIG. 16A is an elevational view of a pin type expanded beam fiber optic terminus in accordance with the present invention configured with the same form factor as the pin type physical contact terminus illustrated in FIG. 16B.

FIG. 16B is an elevational view of a pin type physical contact terminus.

DETAILED DESCRIPTION

The present invention relates to an expanded beam fiber optic connection system which overcomes the problems associated with known expanded beam fiber optic connection systems. In particular, the expanded beam fiber optic connection system in accordance with the present invention includes a pair of mating connectors. Each connector includes a connector body and a plurality of expanded beam fiber optic termini. In accordance with an important aspect of the invention, the expanded beam fiber optic termini are configured with virtually the same form factor as existing physical contact fiber optic termini. The configuration of the expanded beam termini provides several benefits. First, existing physical contact fiber optic connection systems can be updated in the field by simply replacing the existing physical contact fiber optic termini with the new expanded beam fiber optic termini in accordance with the present invention and re-using the existing connector body, thus significantly reducing cost of converting existing physical contact type fiber optic connection systems. Secondly, since the same connector bodies are used for both the physical contact termini and the expanded beam termini, the number of components required for converting to an expanded beam interconnect is reduced, thus reducing manufacturing costs.

Form Factor

Figure 11:
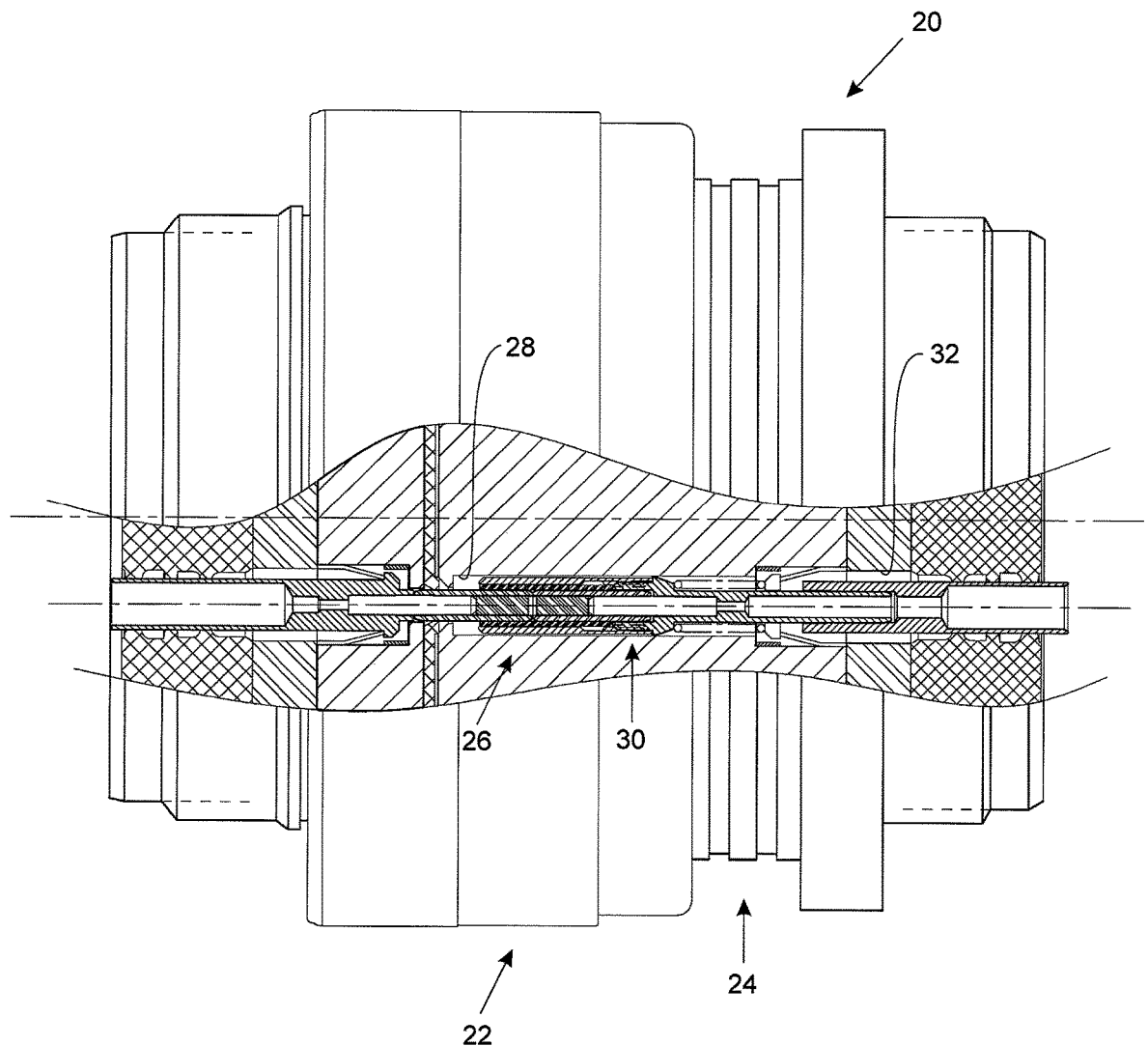
FIG. 11 is a plan view of an exemplary pair of mated connectors configured to meet the dimensional requirements of military specification MIL-C-38999 configured to meet military specification MIL-C-38999 partially in section to illustrate the use of removable expanded beam fiber optic termini in accordance with the present invention.

A key aspect of the invention relates to the fact that the expanded beam termini in accordance with the present invention are formed with the same form factor, i.e external envelope dimensions, as existing physical contact type termini in order to be a drop in replacement for such physical contact type termini. This aspect of the invention is illustrated in FIGS. 11-16B. Referring first to FIG. 11, an exemplary pair of mated connectors qualified to military standard MIL-C-38999 is illustrated and generally identified with the reference numeral 20, formed from a pin connector housing 22 and a socket connector housing 24. In accordance with an important aspect of the invention, a pin type expanded beam terminus, generally identified with the reference numeral 26, is configured to be received within a bore 28 formed within the pin connector housing 22. Similarly, a socket type expanded beam terminus 30 is configured to be received within a bore 32 within the socket connector housing 34.

Expanded beam termini in accordance with the present invention are configured with relatively the same form factor as physical contact type termini, as illustrated in FIGS. 14A-16C. In particular, FIG. 14A illustrates a genderless expanded beam terminus, generally identified with the reference numeral 36 assembly. The genderless expanded beam terminus assembly 36 includes an expanded beam terminus 37 and a rear body 38. FIG. 14B illustrates a physical contact terminus assembly 39 which includes a physical contact terminus 40 and a rear body 41. As can be seen, the form factor of the expanded beam terminus assembly 36 is configured to have essentially the same form factor as the physical contact terminus assembly 39. As such, the expanded beam terminus assembly 36 is a drop in replacement for the physical contact terminus assembly 39.

FIG. 15A illustrates a socket type expanded beam terminus assembly 42 while FIG. 15B illustrates a socket type physical contact terminus assembly 43. FIG. 16A illustrates a pin type expanded beam terminus assembly 44 while FIG. 16B illustrates a pin type physical contact terminus assembly 45. As shown, the form factors of the socket and pin termini of the expanded beam assemblies 42 and 44 are configured to have the essentially the same form factors as the socket and pin termini of the physical contact termini assemblies 43 and 45.

The fiber optic termini in accordance with the present invention can formed for use in many applications. For example, FIGS. 12A-12C illustrate an application of the expanded beam fiber optic termini in a connector qualified to military standard MIL-DTL-38999 while FIGS. 13A-13C illustrate an application in a connector qualified to ARINC standard 83527.

Figure 12A:
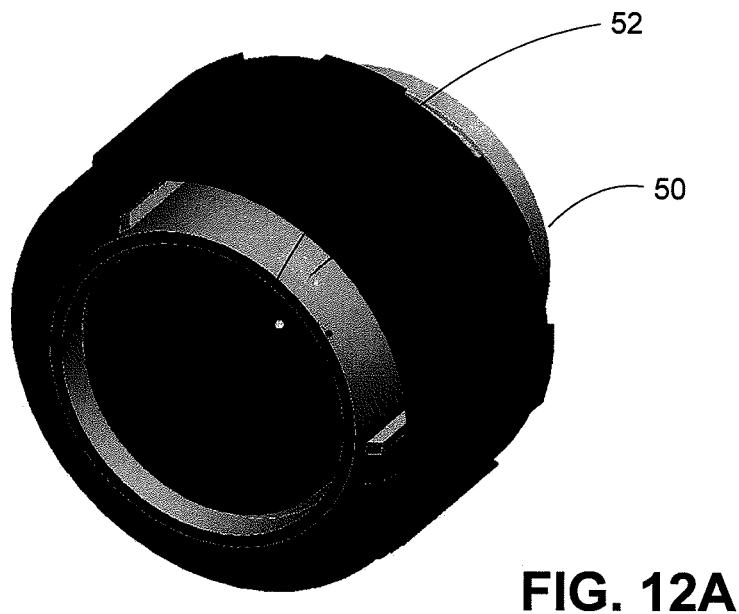
FIG. 12A is an isometric view of an exemplary fiber optic connector body configured to meet the dimensional requirements of military specification MIL-C-38999.
Figure 12B:
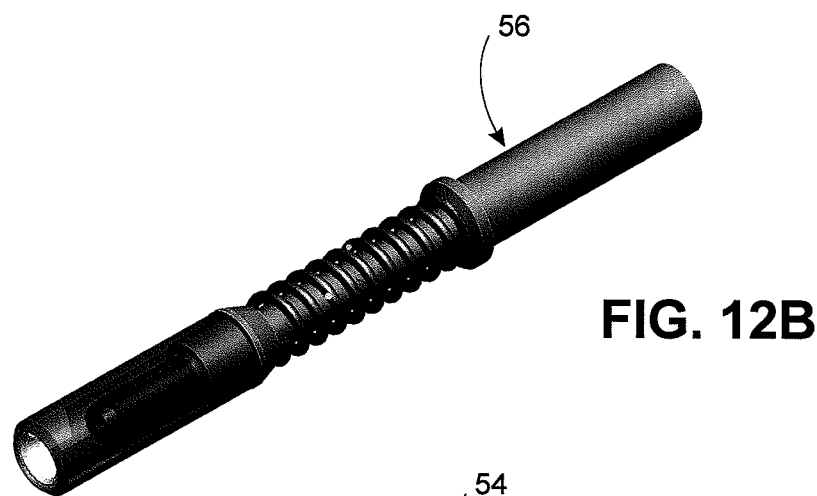
FIG. 12B is an isometric view of an expanded beam socket terminus in accordance with the present invention for use with the fiber optic connector illustrated in FIG. 12A.
Figure 12C:
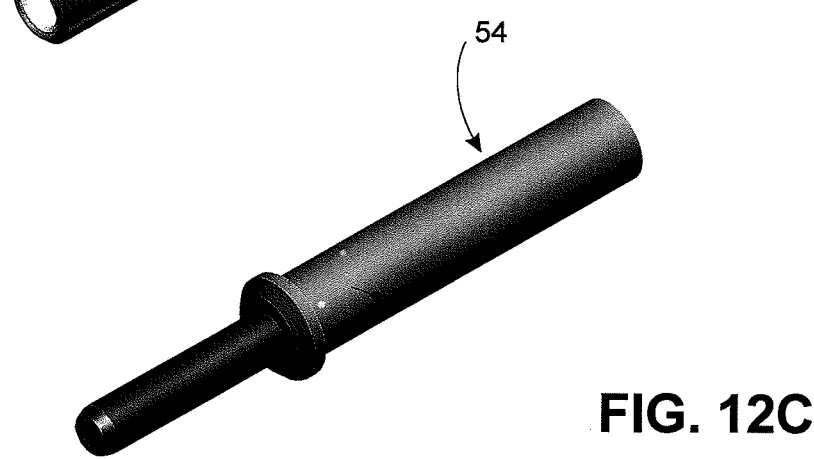
FIG. 12C is an isometric view of a pin terminus in accordance with the present invention for use with the fiber optic connector illustrated in FIG. 12A.

Referring first to FIG. 12A, an exemplary connector housing 50 is illustrated. The connector housing includes a number of bores, generally identified with the reference numeral 52. The exemplary connector housing 50 shown in FIG. 12A is configured to comply with military standard MIL-DTL-38999. The bores 52 are configured to receive pin and socket termini configured to meet the envelope dimensions set forth in military standard MIL-PRF-29504/4 and /5, which are for physical contact type fiber optic termini. In accordance with the invention, expanded beam fiber optic pin and socket termini 54 and 56 are configured with essentially the same envelope dimensions as set forth in military standard MIL-PRF-29504/4 and /5. As such, the expanded beam fiber optic termini 54 and 56 are drop in replacements for corresponding physical contact fiber optic termini.

Figure 13A:
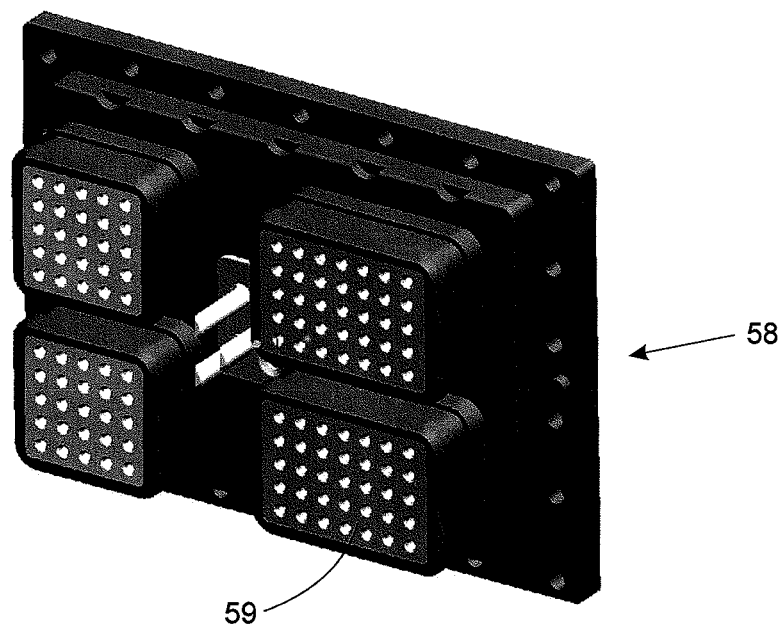
FIG. 13A is an isometric view of an exemplary fiber optic connector configured to meet standard ARINC 83527.
Figure 13B:
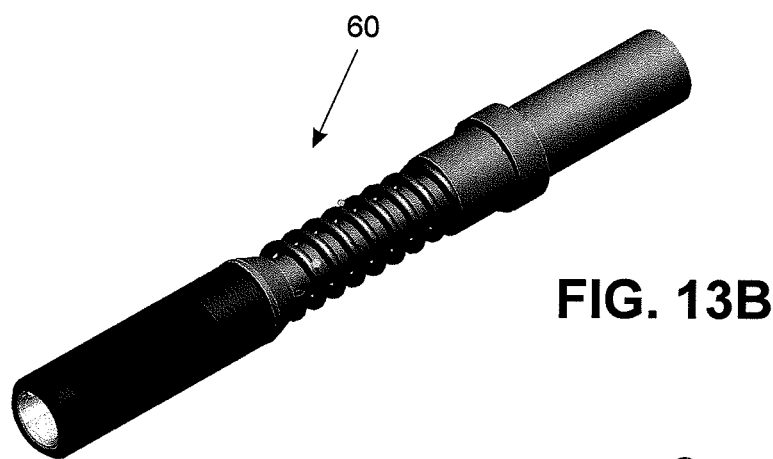
FIG. 13B is an isometric view of a socket terminus in accordance with the present invention for use with the fiber optic connector illustrated in FIG. 13A.
Figure 13C:
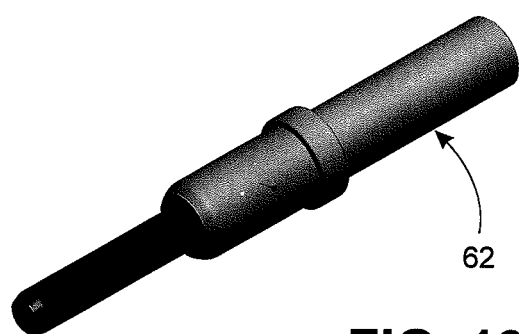
FIG. 13C is an isometric view of a pin terminus in accordance with the present invention for use with the fiber optic connector illustrated in FIG. 13A.

Referring to FIG. 13A, an exemplary connector housing 58 is illustrated. The connector housing 58 includes a number of bores, generally identified with the reference numeral 59. The exemplary connector housing 58 shown in FIG. 13A is configured to comply with ARINC standard 83527. The bores 59 are configured to receive pin and socket termini configured to meet the envelope dimensions set forth in standard MIL-PRF-29504/6 and /7, which are for physical contact type fiber optic termini. In accordance with the invention, expanded beam fiber optic pin and socket termini 60 and 62 are configured with essentially the same envelope dimensions as set forth in standard MIL-PRF-29504/6 and /7. As such, the expanded beam fiber optic termini 60 and 62 are drop in replacements for corresponding physical contact fiber optic termini.

In addition to the examples set forth above, the expanded beam termini in accordance with the present invention can be configured to be used in virtually any application, i.e connector body that has removable physical contact type termini. In particular, since many known fiber optic connection systems have removable termini, the expanded beam fiber optic termini in accordance with the present invention can be used to replace physical contact type termini in the field.

Expanded Beam Design

Configuration of the fiber optic connection system in accordance with the present invention allows a lens (graded index, spherical, or other) to be directly aligned with the fiber optic ferrule, independent of the connector or connector insert, rather than being aligned within a bore of a multi-cavity insert as in known prior art. In particular, in one embodiment of the invention, in order to resolve the mechanical issues associated with the prior art, the lens is aligned with an optical fiber ferrule by way of a lens ferrule or shroud, which, in turn, is aligned with a mating lens ferrule by way of an aligning feature, such as a sleeve, thus providing direct alignment of the mating lens ferrules independent of the connector.

Figure 8:
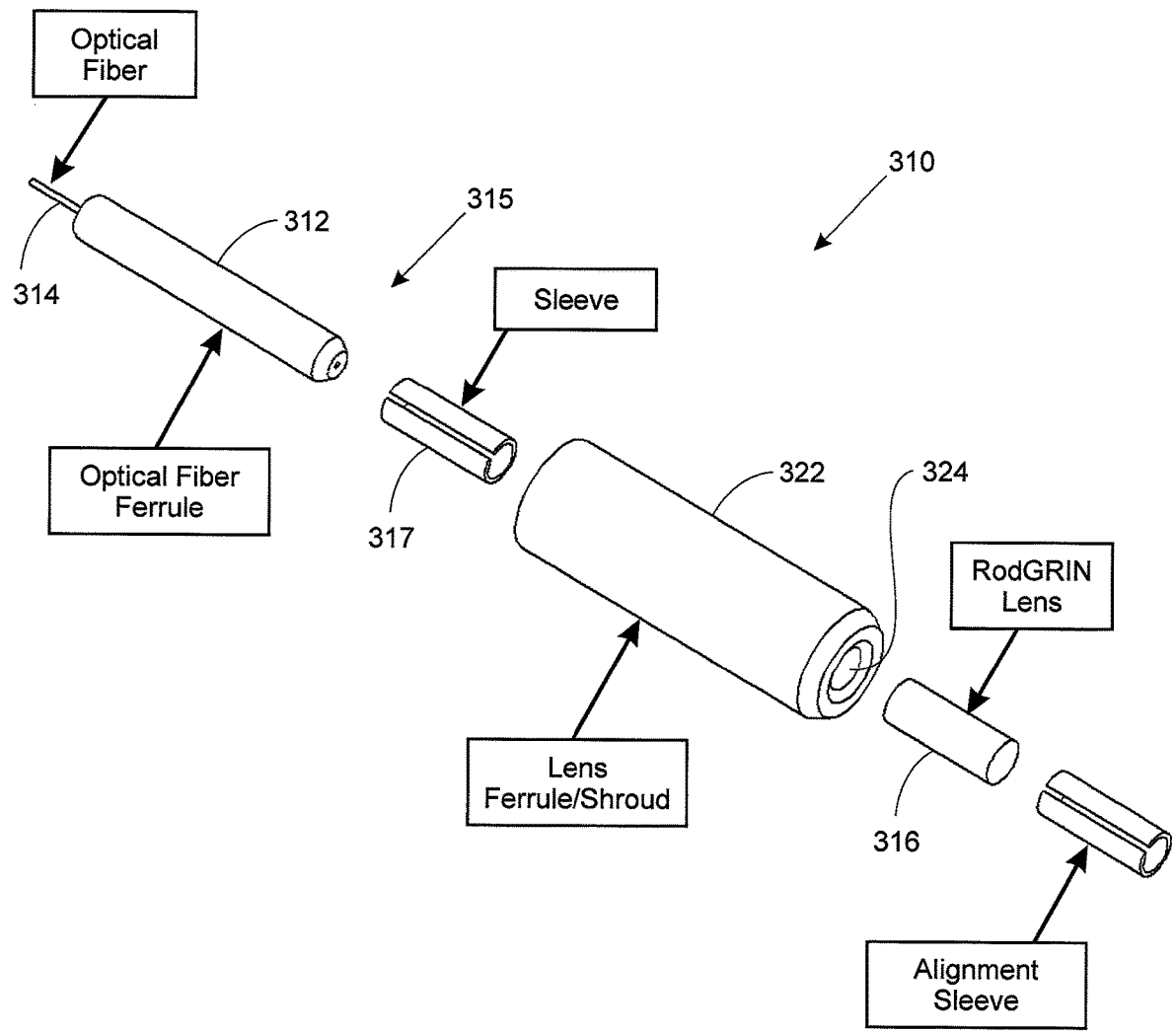
FIG. 8 is an exploded isometric view of a third embodiment of the invention, shown without a connector body.
Figure 9:
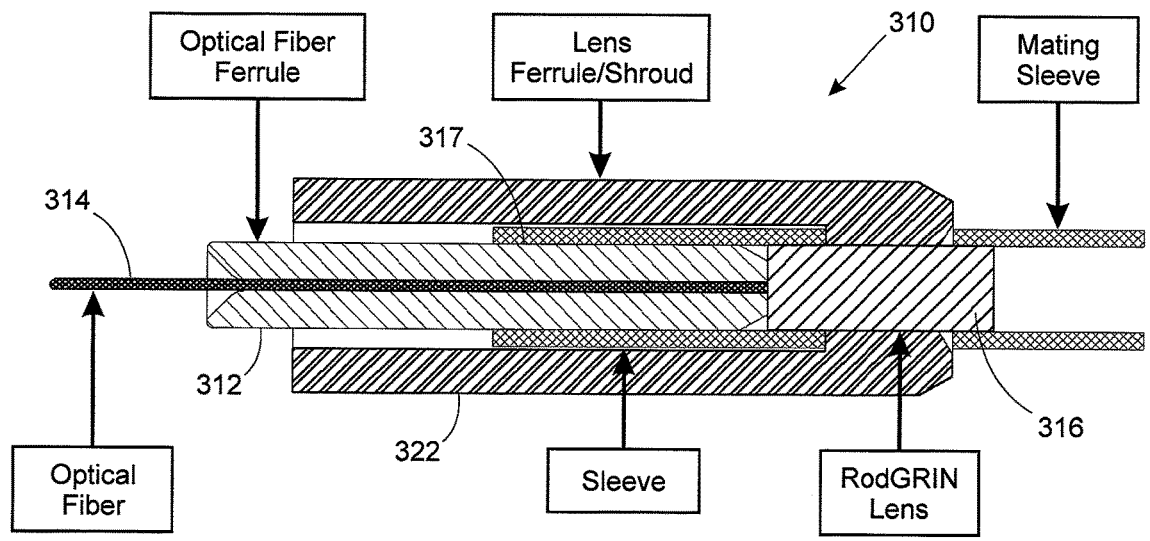
FIG. 9 is a cross sectional view of a mated pair of the expanded beam connectors by way of an alignment sleeve, in accordance with the third embodiment of the invention, shown with the connector body removed.
Figure 10:
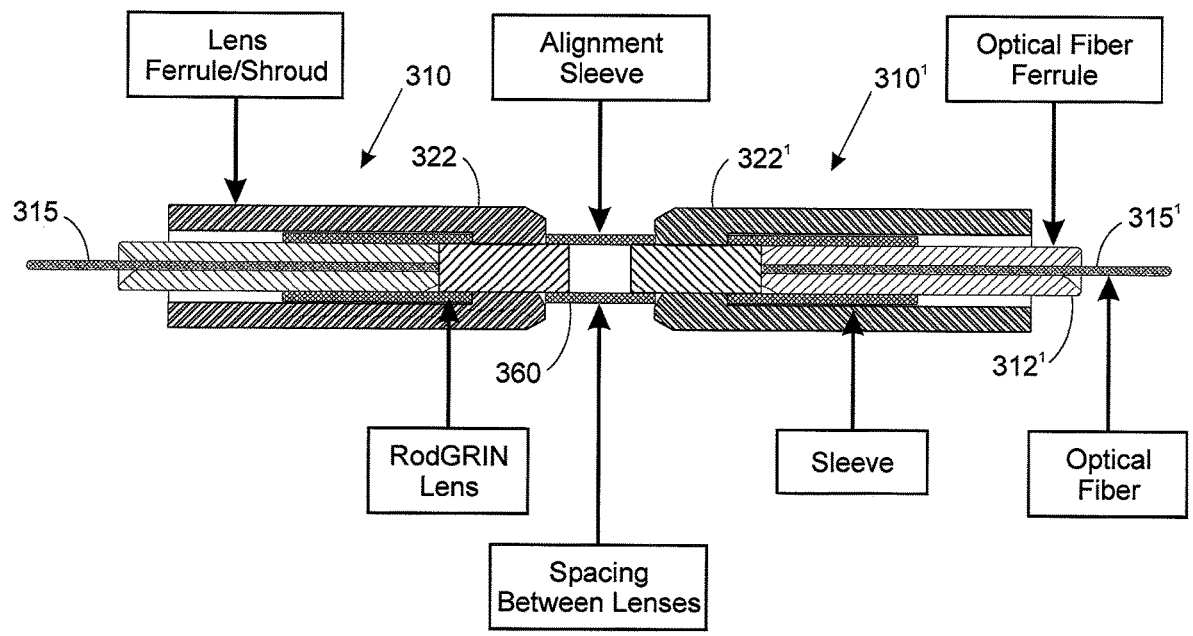
FIG. 10 is a cross sectional view of a mated pair of expanded beam fiber optic connectors, shown with the connector body removed in accordance with the third embodiment of the invention.

As will be discussed in more detail below, the lens is inserted into a ferrule or shroud assembly disposed at the end of a pre-terminated fiber optic ferrule, i.e. terminus. Three (3) embodiments of the invention are described below in FIGS. 2-10. In the first embodiment, illustrated in FIGS. 2-4G, the outer ferrule/shroud directly aligns the lens to the fiber optic ferrule. Additionally, the outer shroud diameter serves as the primary alignment feature between mating expanded beam termini. The second embodiment, illustrated in FIGS. 5-7, also uses the outer shroud diameter as the primary alignment feature between the termini. However, in this design, the lens is aligned to the fiber optic ferrule using an alignment feature, such as a sleeve, inside the shroud. The third embodiment, illustrated in FIGS. 8-10, is configured similar to the first and second embodiments, as the lens is aligned to the fiber optic ferrule using a lens ferrule or inner sleeve, respectively. This design differs from the previous two because the primary alignment between mating expanded beam termini is achieved by using an alignment feature, such as a sleeve, to capture the opposite ends of the lenses protruding from the lens ferrule or shroud.

A key feature of this invention distinguishing it from expanded beam fiber optic connectors of the prior art is that the lens used for the beam expansion and alignment is contained within each terminus. This feature is distinctly different from the prior art, which uses a connector insert with single or multiple cavities into which the lenses and fiber ferrules are inserted. The mating inserts of the prior art are then brought into alignment by way of various tight toleranced connector features to create an optical path or connection. Each of the embodiments is discussed below.

Optical Design

Figure 1:
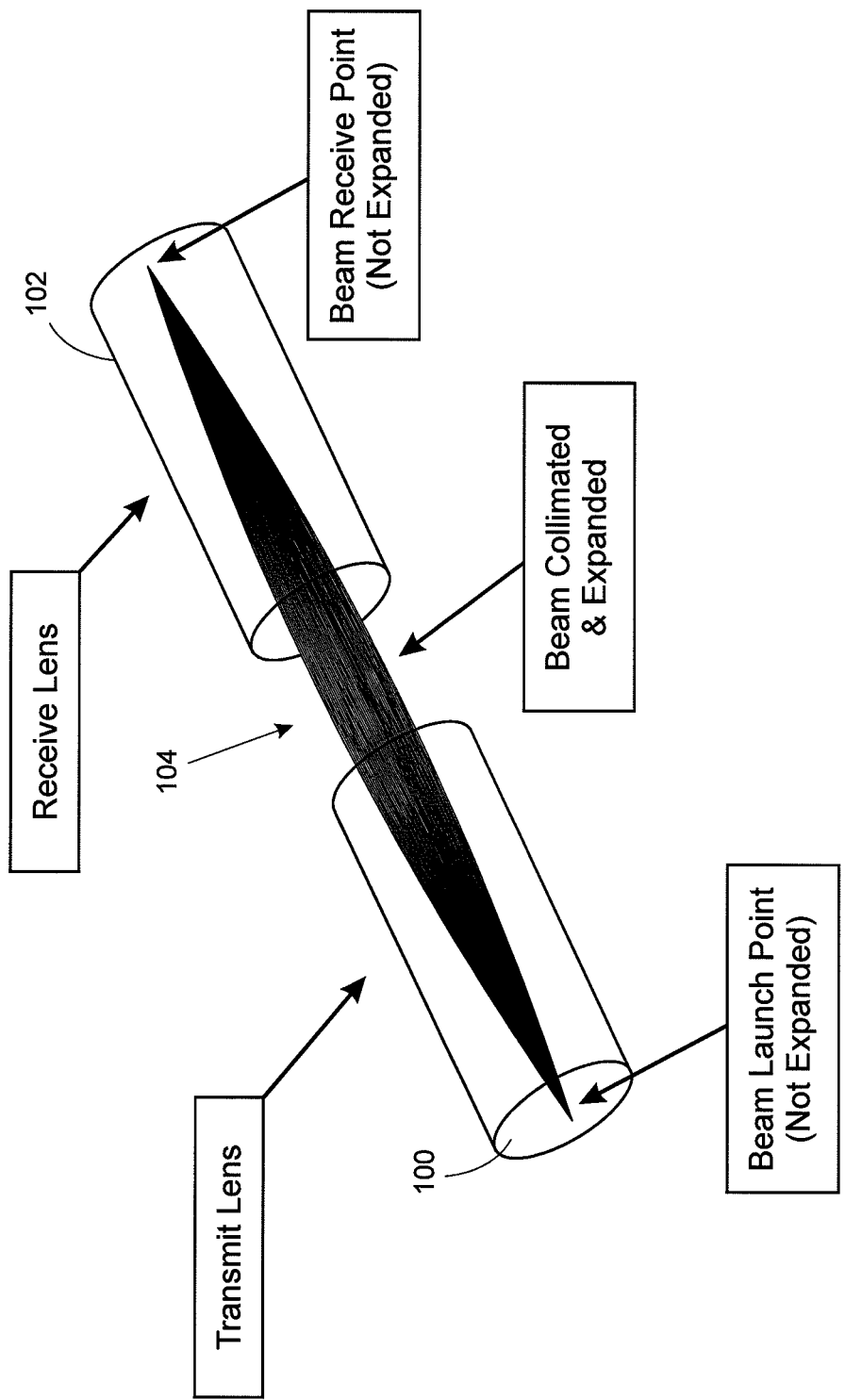
FIG. 1 is an optical simulation of beam expansion and focusing that takes place inside the GRIN lenses.

The optical design of the fiber optic connector in accordance with the present invention is illustrated in FIG. 1. In particular, FIG. 1 illustrates the optical design of two mating expanded beam fiber optic termini. For simplicity, only the lenses within the connectors are shown and illustrated and identified with the reference numerals 100 and 102. As shown, the lens 100 is identified as the "Transmit Lens" while the lens 102 is identified as the "Receive" lens. As will be discussed in more detail below, a transmit fiber optic terminus (not shown) is disposed adjacent to the "Beam Launch Point" of the Transmit Lens 100 and mechanically aligned therewith. Similarly, a receive fiber optic terminus (not shown) is disposed adjacent to "Beam Receive Point" of the Receive Lens 102 and also mechanically aligned with it.

As shown, the lenses 100 and 102 are juxtaposed so that there is a gap between the lenses 100 and 102. An optical beam from the transmit lens 100 is expanded and collimated in the Transmit Lens 100 and projected upon the Beam Receive Point in the Receive Lens 102. Unlike direct contact fiber optic connectors, there is no physical connection of the mating connectors in the optical path. Indeed, the connectors in accordance with the present invention and thus the lenses 100, 102 are separated, as will be discussed in more detail below, defining a gap, identified with the reference numeral 104, for example, 3 millimeters. As shown, the Transmit Lens 100 is configured as a rod having a graded refractive index with a parabolic profile and length so that the expanded beam is collimated as it leaves the Transmit Lens 100. As mentioned before this invention is compatible with other types of collimating lenses such as spherical and plano-convex.

The dimensions of the GRIN lens are a function of the diameter and the wavelength. In this invention 0.25-pitch lenses are used so that the optical fiber may come in direct contact with the end face of the GRIN lens and have the output beam fully collimated. Based on the 0.25-pitch requirement, a 1-mm outer diameter and a typical operational wavelength of 1550-nm (a wavelength commonly used in optical communications) the overall length of the GRIN lens is analytically determined to be e 2.64-mm. Similarly, the length of the GRIN lens can be lengthened or shortened during fabrication to optimize transmission at other wavelengths. Additionally, both surfaces of the GRIN lens have an anti-reflective coating which reduce reflective loss at the interfaces with out the use of index-matching liquids or gels. Lastly, the gap between the mated termini (0.5-mm in current embodiments) was experimentally and theoretically determined to be optimal based on the aforementioned applications and the optical performance. However, the design allows for flexibility in the gap based on future requirements, briefly however the gap can be reduced to zero (so that the lenses touch) and reasonably extended to 10-mm.

First Embodiment

The first embodiment of the invention is illustrated in FIGS. 2-4G. Referring first to FIGS. 2, 3A, 4F and 4G, a first embodiment of the expanded beam fiber optic connector in accordance with the present invention is illustrated and generally identified with the reference numeral 110. The expanded beam fiber optic connector 110 includes an optical fiber ferrule 112 for carrying an optical fiber 114 forming a terminus. In accordance with an important aspect of the invention, expanded beam fiber optic connector 110 includes a GRIN lens 116. The GRIN lens 116 and the fiber optic ferrule 112 are concentrically aligned by way of a lens ferrule or shroud 118.

Figure 3A:
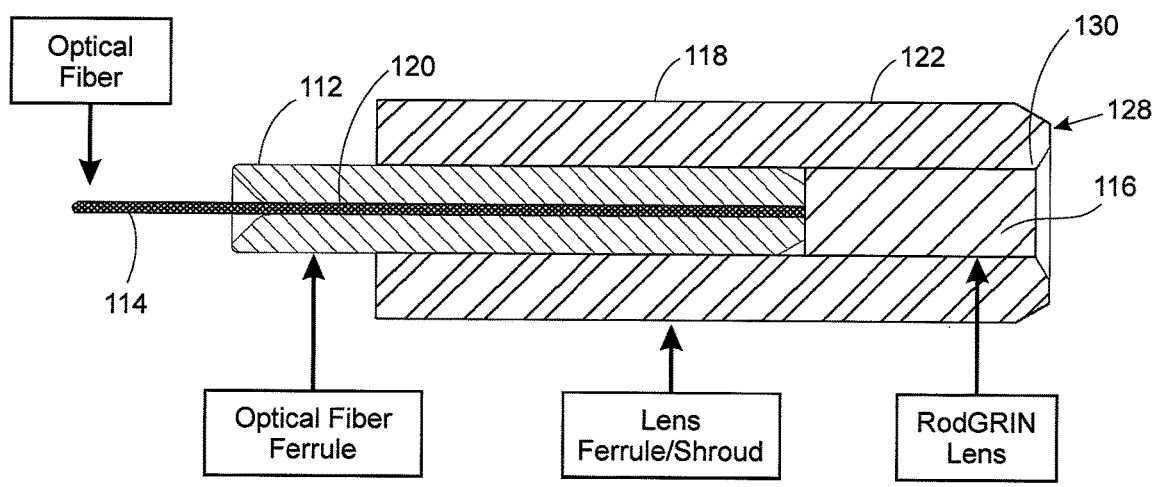
FIG. 3A is a simplified cross sectional view of an assembled expanded beam connector, illustrated in FIG. 2, shown with the connector body removed.

The optical fiber ferrule 112 is formed in a generally cylindrical shape. A central longitudinal feed through hole 120 is formed in the center of the optical fiber ferrule 112 for receiving an optical fiber 114. The through hole 118 is sized to have a diameter slightly larger than the diameter of the optical fiber 114. In order to secure the optical fiber 114 to the fiber ferrule 112, the through hole 120 is filled with an adhesive, such as an epoxy, for example Tra-Bond, Tra-Con BAF 113SC or EPO-TEC 353 ND. The adhesive may be inserted into the through hole 120 by way of a syringe. One end of the optical fiber 114 is polished and disposed to be flush with the end of the fiber ferrule 112 As shown in FIG. 3A, the other end of the optical fiber 114 extends outwardly from the optical fiber ferrule 112 and connects to an optical circuit (not shown).

A precision lens ferrule or shroud 122 is used to mechanically align the optical fiber ferrule 112 and the GRIN lens 116. The outer diameters of the optical fiber ferrule 112 and the GRIN lens 116 are formed to be slightly larger than the inner diameter of the lens ferrule 122. As such, the optical fiber ferrule 112 and the GRIN lens 116 are press fit into the lens ferrule 122 and are thus held in place by friction. Alternatively, an adhesive may be used to secure the GRIN lens.

Figure 2:
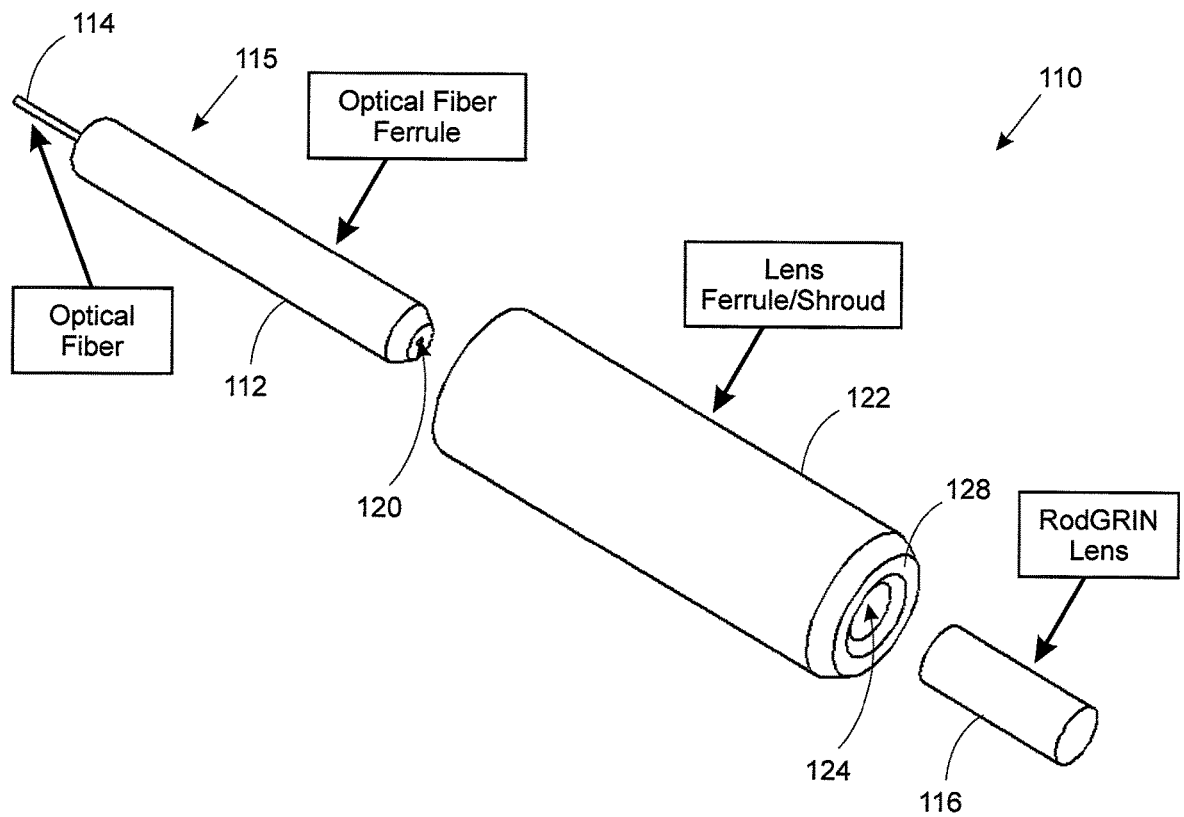
FIG. 2 is an exploded isometric view of an expanded beam connector prior to assembly in accordance with a first embodiment of the present invention.

The lens ferrule 122 is formed as a cylindrical member formed with a centrally located longitudinal through hole 124. The lens ferrule 122 is precision component that may be made from stainless steel, or molded from ceramic or other material that maintains dimensional precision. The lens ferrule 122 is used for multiple alignment functions. In particular, as discussed above, the lens ferrule 112 is used to align the fiber ferrule 112 and GRIN lens 116 with respect to each other. The outer diameters of the fiber ferrule 112 and the GRIN lens 116 are formed to be slightly larger than the centrally located longitudinal through hole 124 in the lens ferrule 122. As such, the fiber ferrule 112 and GRIN lens 116 are press fit into lens ferrule 122 or alternatively secured with an adhesive. As best shown in FIGS. 2 and 3A, the lens ferrule 122 is formed with an annular shoulder 128 on one end. As shown, the fiber ferrule 112 and the GRIN lens 116 are in an abutting relationship. The free end of the GRIN lens 116 is disposed to be generally aligned with the base 130 (FIG. 3A) of the annular shoulder 128. As shown, the free end of the fiber ferrule 112 extends outwardly from an opposing end of the lens ferrule 122.

In addition, the fiber ferrule 112 of each expanded beam terminus 110 is also used to align the mating expanded beam terminus 110. In particular, referring to FIG. 4A, two mating expanded beam termini are shown in a mating relationship. For simplicity, the expanded beam fiber optic termini shown on the right and its components are designated with the same reference numerals as the fiber optic termini on the left but designated with primes. As shown, the lens ferrules 110 and 110' are received within an alignment sleeve 126 and butted together. The annular shoulders 128 and 128' formed in the lens ferrules 122 and 122', respectively, provide for a gap 104 (FIG. 1) when the lens ferrules 110 and 110' are butted together—shoulder 128 to shoulder 128'.

Figure 3B:
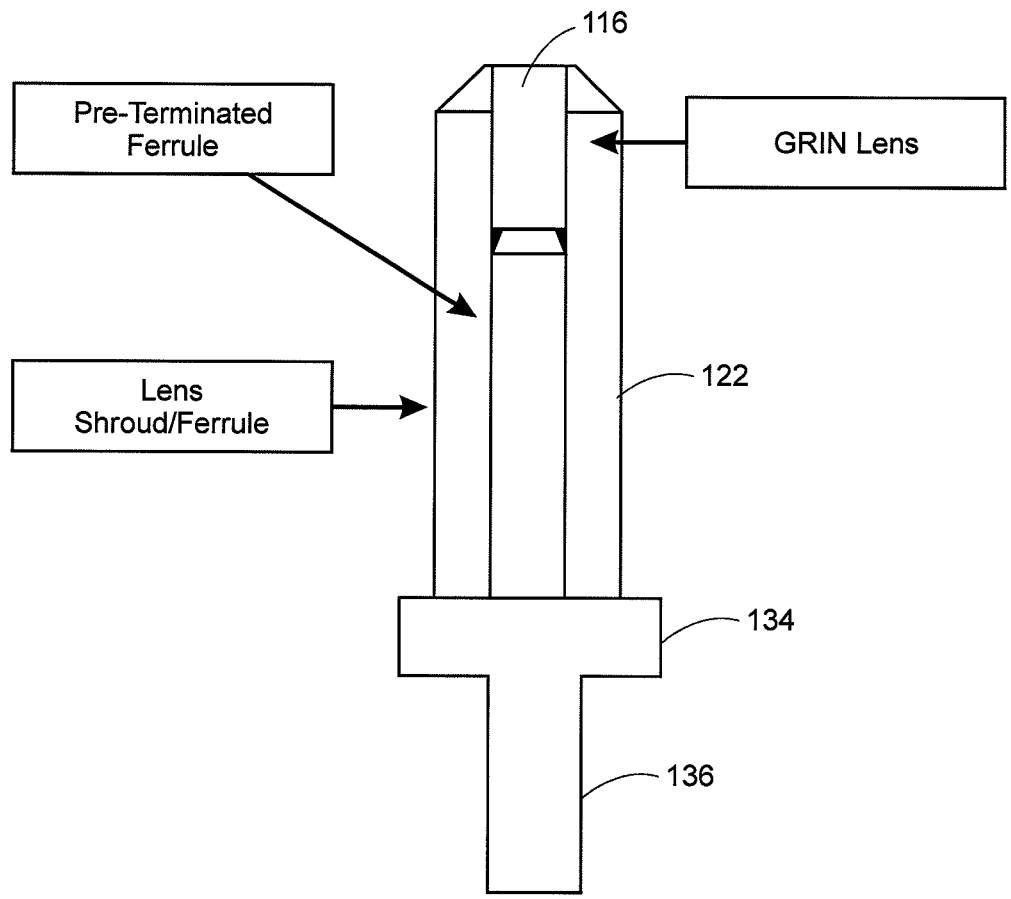
FIG. 3B is similar to FIG. 3A but shown with an exemplary front connector body.
Figure 4A:
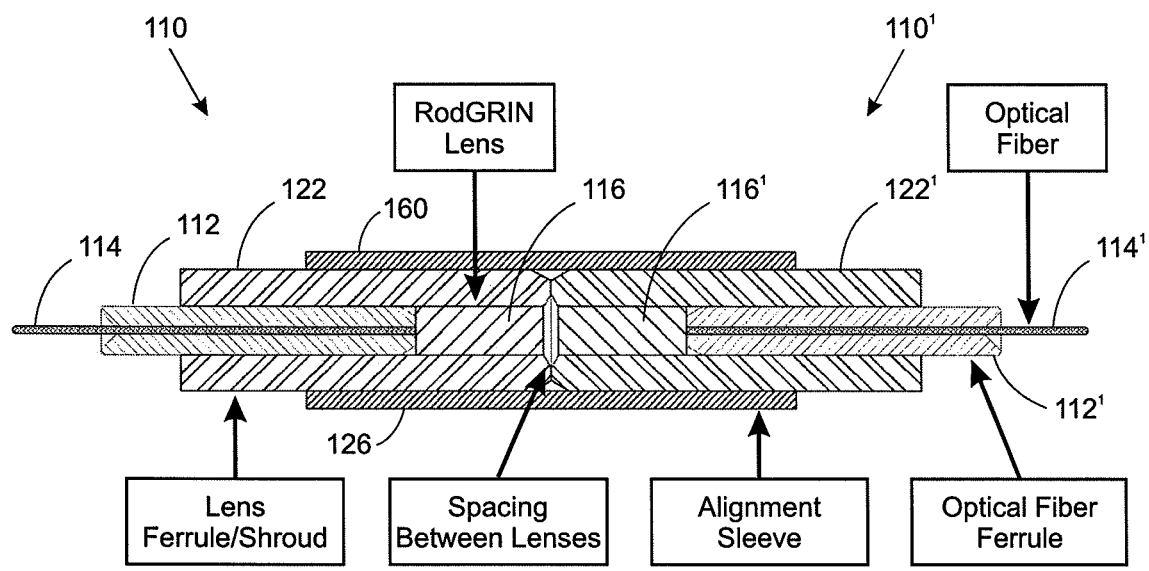
FIG. 4A is a cross sectional view of a mated pair of the expanded beam connectors by way of an alignment sleeve, in accordance with a first embodiment of the invention, shown with the connector body removed.
Figure 4B:
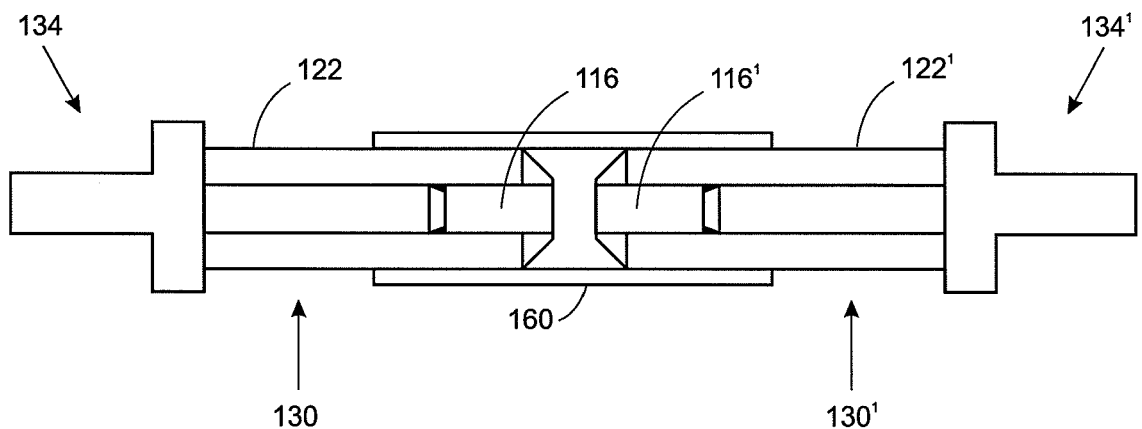
FIG. 4B is similar to FIG. 4A but shown with an exemplary front connector body.
Figure 4C:
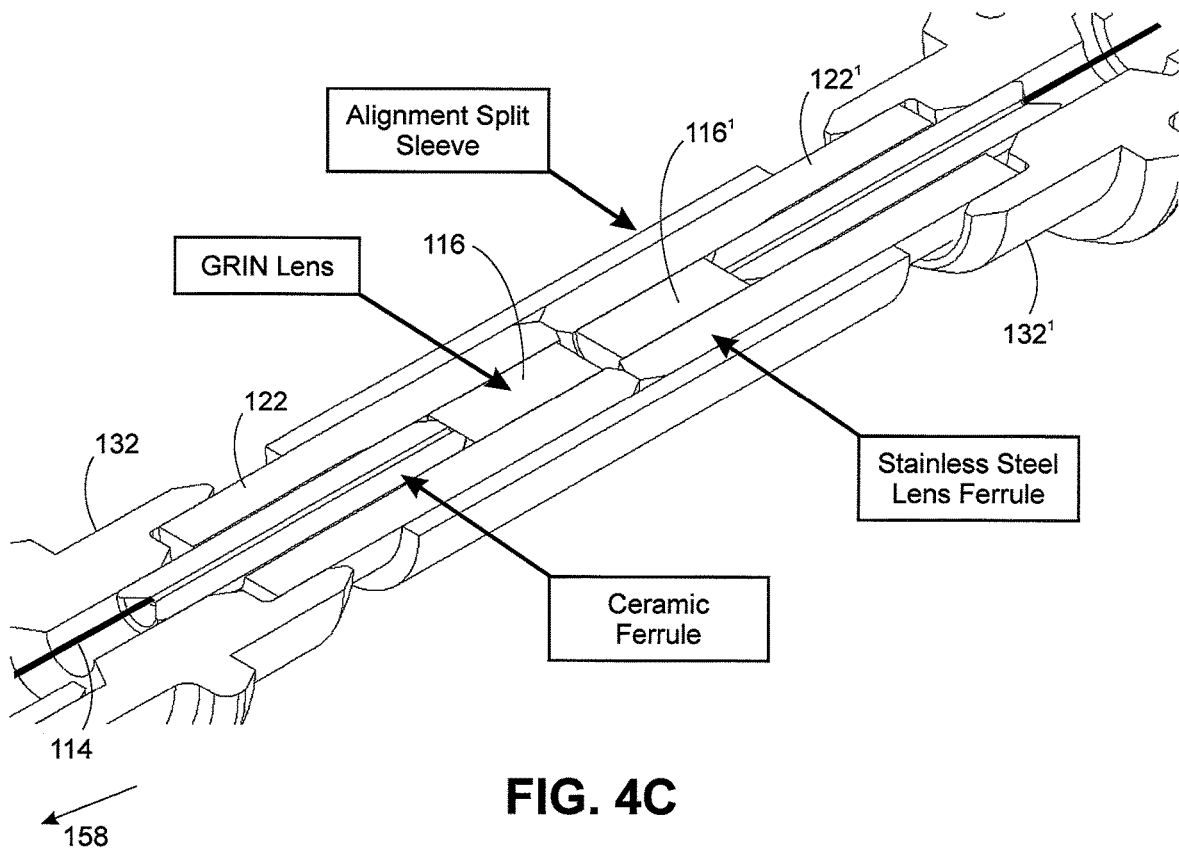
FIG. 4C is a fragmentary isometric view of a mated pair of expanded beam connectors in accordance with a first embodiment of the invention complete with a front connector body in accordance with the first embodiment of the invention, cut along a longitudinal axis with a top portion of the connectors removed

FIGS. 2, 3A and 4A illustrate expanded beam fiber optic connectors 110 and 110' without connector bodies for clarity. FIGS. 3B and 4B illustrate a first exemplary rear body or base, generally identified with the reference numeral 132. The rear body 132 may be formed with a configuration so as to be used as a drop in replacement in military type connectors, an example of one such terminus is FIG. 14A. Moreover, the expanded beam terminus can be dimensionally changed to be used in virtually any application such as the industry standard connector applications discussed above.

The rear body 132 is may be machined from stainless steel or molded from ceramic and formed with a large diameter portion 134 and a small diameter portion 136. The large diameter portion 134 is formed with a central bore (not shown) formed slightly larger than the outer diameter of the lens ferrule 122. The assembled lens ferrule 122 is press fit into the rear body 136. The smaller diameter portion 136 is formed with a through hole (not shown) for receiving an extending portion of the fiber ferrule 112, as generally shown in FIG. 3A.

FIGS. 4C-4G illustrate the expanded beam terminus 110 with an alternate rear body; namely a two-piece connector body used for strain relief. In FIGS. 4C-4G, components which are identical with the components illustrated in FIGS. 1-3, 4A and 4B are identified with like reference numbers. Moreover, like components in complementary termini are identified with primes. The fiber optic termini in accordance with the present invention can also be implemented with rear bodies other than those described and illustrated.

Figure 4D:
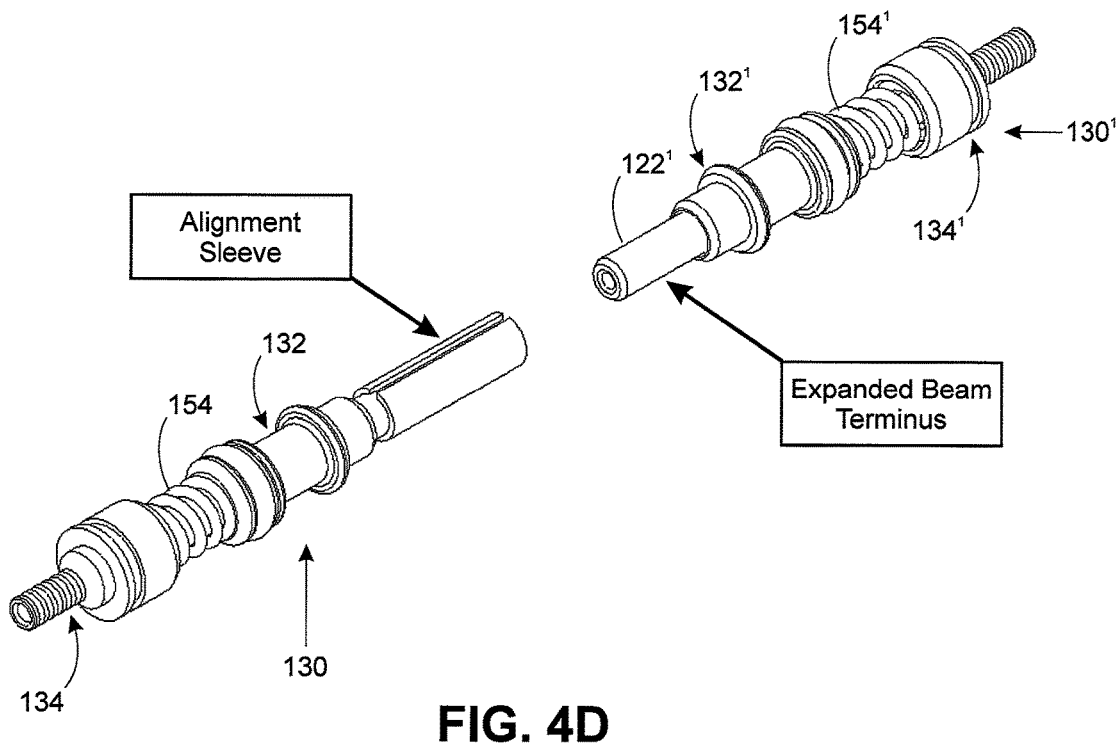
FIG. 4D is an isometric view of a mating pair of expanded beam connectors complete with exemplary full connector bodies in accordance with the first embodiment of the invention shown in an un-mated condition.
Figure 4E:
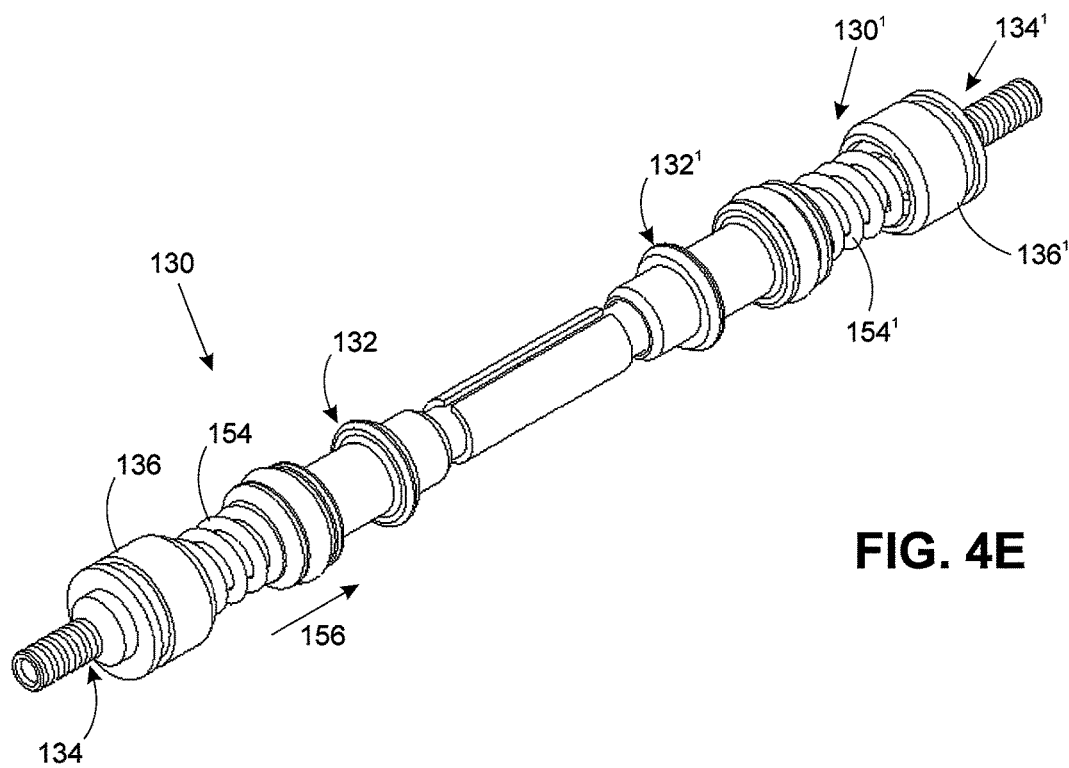
FIG. 4E is similar to FIG. 4D but shown mated.
Figure 4F:
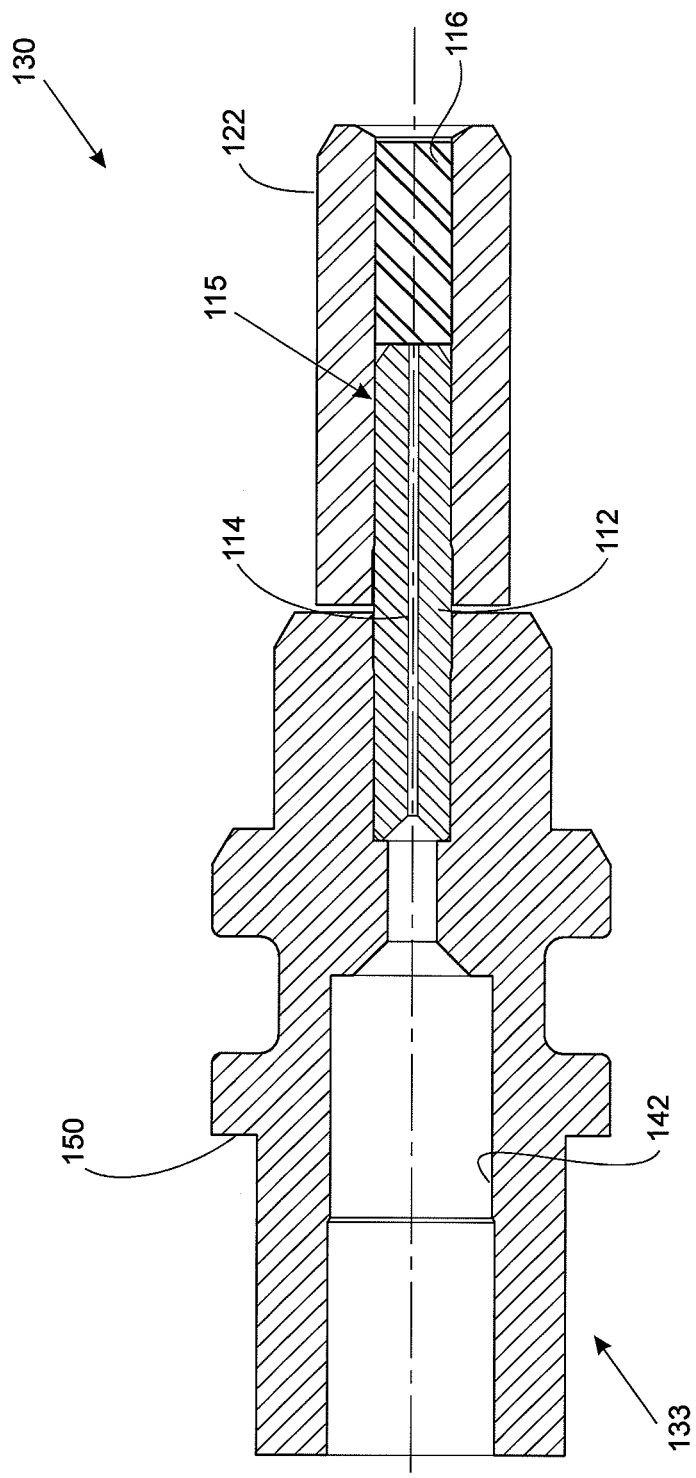
FIG. 4F is sectional view of an of expanded beam connector complete with exemplary front connector in accordance with the first embodiment of the invention.
Figure 4G:
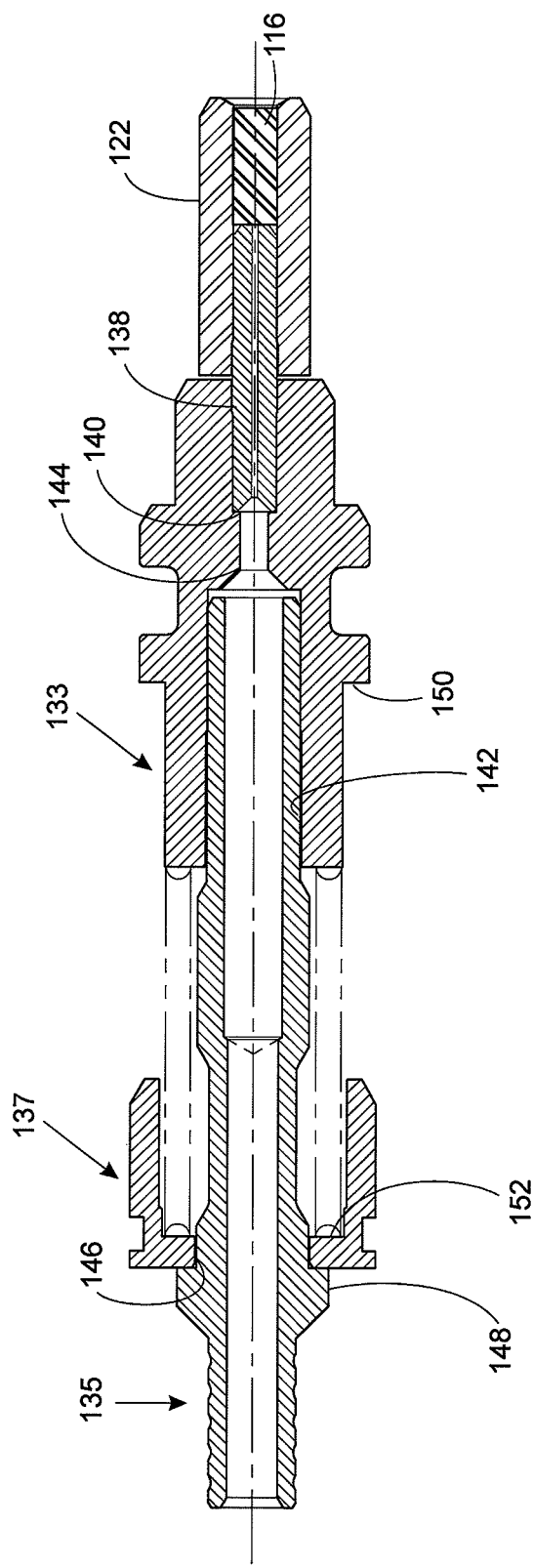
FIG. 4G is similar to FIG. 4F but shown with an exemplary front connector body and an exemplary rear connector body.

Referring first to FIGS. 4F and 4G, a fiber optic terminus 130 is illustrated. FIG. 4F illustrates the terminus, generally identified with the reference numeral 115, formed from optical fiber 114 and an optical fiber ferrule 112. The terminus 115 is received in a lens ferrule 122, used to align the terminus with a GRIN lens 116. In this embodiment of the invention the rear body is formed as a two (2) piece body, namely a front body 133 and a rear body 135. As will be discussed in more detail below, two piece bodies are used in applications where strain relief of the optical fiber is required. In a two (2) piece body embodiment, a spring retainer 137 is required.

The front body 133 is formed with a first bore 138 for receiving the terminus 115. The outer diameter of the first bore 138 is formed slightly larger than the outer diameter of the terminus 115 in order to enable to be press fit or bonded in the bore 138, for example. A first annular shoulder 140 acts as a stop to limit the axial penetration of the terminus 115 into the first bore 138. The front body 133 is formed with a second bore 142 for receiving the rear body 135. The second bore 142 in the front body 133 is formed with a slightly diameter than the outer diameter of the rear body 135 to enable the rear body 135 to be secured to the front body 133 by way of a press fit, for example. A second annular shoulder 144 acts as a stop and limits the axial penetration of the rear body into the bore 142.

Prior to securing the rear body 135 into the front body 133, the rear body 134 is fed through a bore 146 in the spring retainer 137 to capture the spring retainer 137 between the rear connector body 135 and front connector body 133, as generally illustrated in FIG. 4G. In particular, the spring retainer 137 is captured between an external annular shoulder 148 on the rear body 135 and an external annular shoulder 150, formed on the front body 133. An interior annular shoulder 152 formed on the spring retainer 176 forms a bearing surface for one end of a biasing spring 154 (FIG. 4E). The annular shoulder 150 (FIG. 4G) on the front connector body 133 forms an opposing bearing surface for the biasing spring 154 (FIG. 4E). The direction of the spring force is in the direction of the arrow 156. Thus, any forces on the optical fiber 114 (FIG. 4C) in the direction of the arrow 158 will be resisted by the spring force from the biasing spring (154) thus providing strain relief.

FIGS. 4B, 4D and 4E illustrate the mating of two (2) fiber optic termini 130 and 130'. In this embodiment, the two (2) fiber optic termini 130 and 130' are aligned by way of an alignment sleeve 160, for example, a split alignment sleeve. In particular, each connector 130 and 130' is configured so that the lens ferrule 122 extends outwardly from the front body 132 (FIGS. 3B and 4B) and 133 (FIGS. 4F and 4G). As shown in FIG. 3A, for example, the extending end of the lens ferrules 122 and 122' are formed with the extending annular shoulders 128. As shown, the GRIN lens 116 is recessed relative to the annular shoulder. As such, when the lens ferrules of the two termini 130 and 130' are in contact, a gap 104 (FIG. 1) between the GRIN lenses in the mating connectors 130 and 130' will exist.

Second Embodiment

Figure 5:
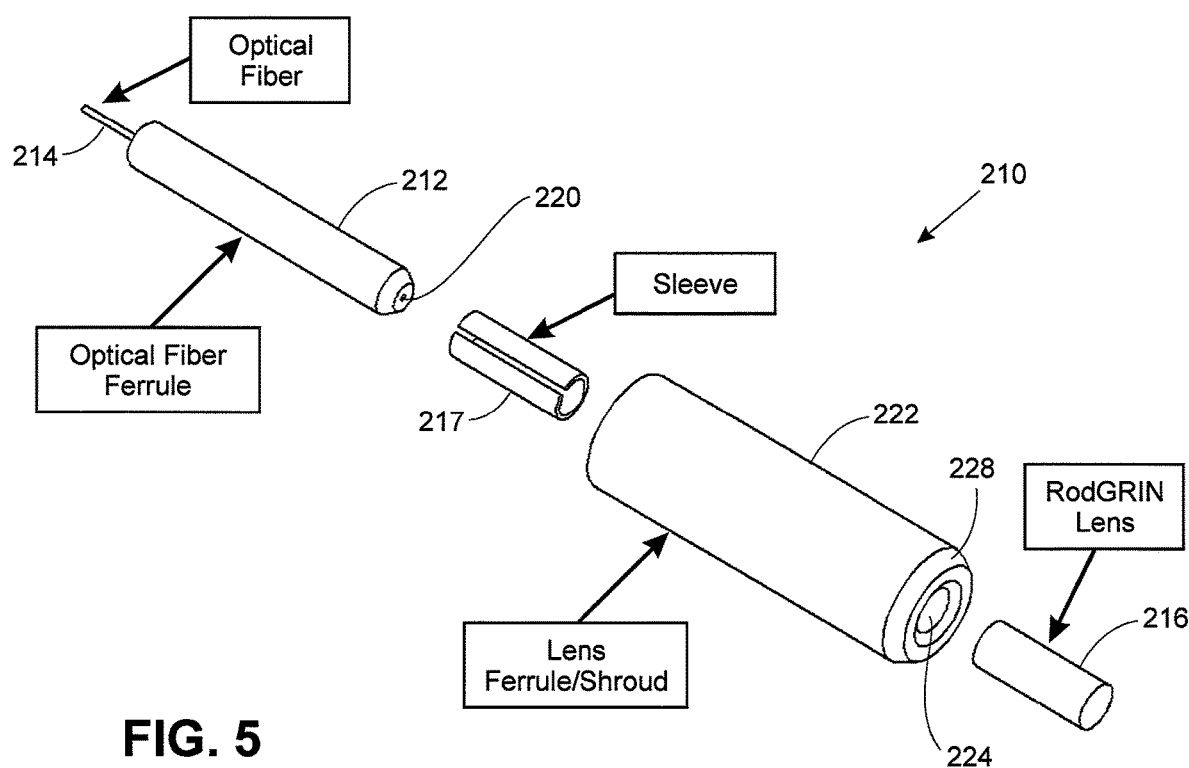
FIG. 5 is an exploded isometric view of an alternate expanded beam termini construction in which the GRIN lens is aligned to the ferrule using an alignment sleeve in accordance with a second embodiment of the invention.
Figure 6A:
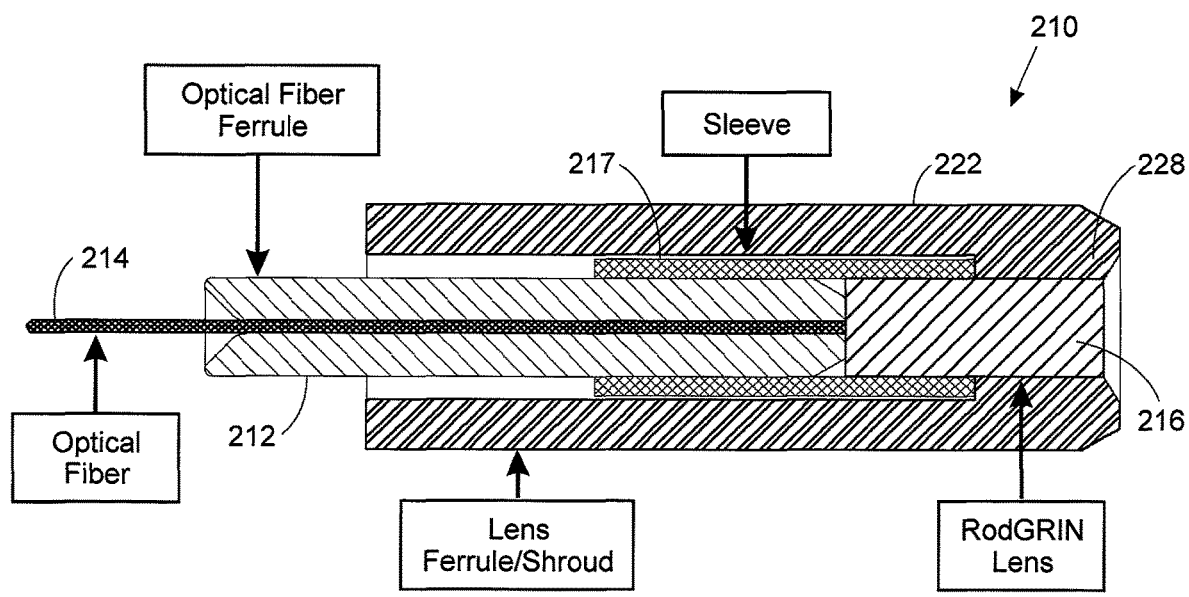
FIG. 6A is a cross section view of an alternate expanded beam termini construction in which the GRIN lens is aligned to the ferrule with an alignment sleeve, shown with the connector body removed.
Figure 6B:
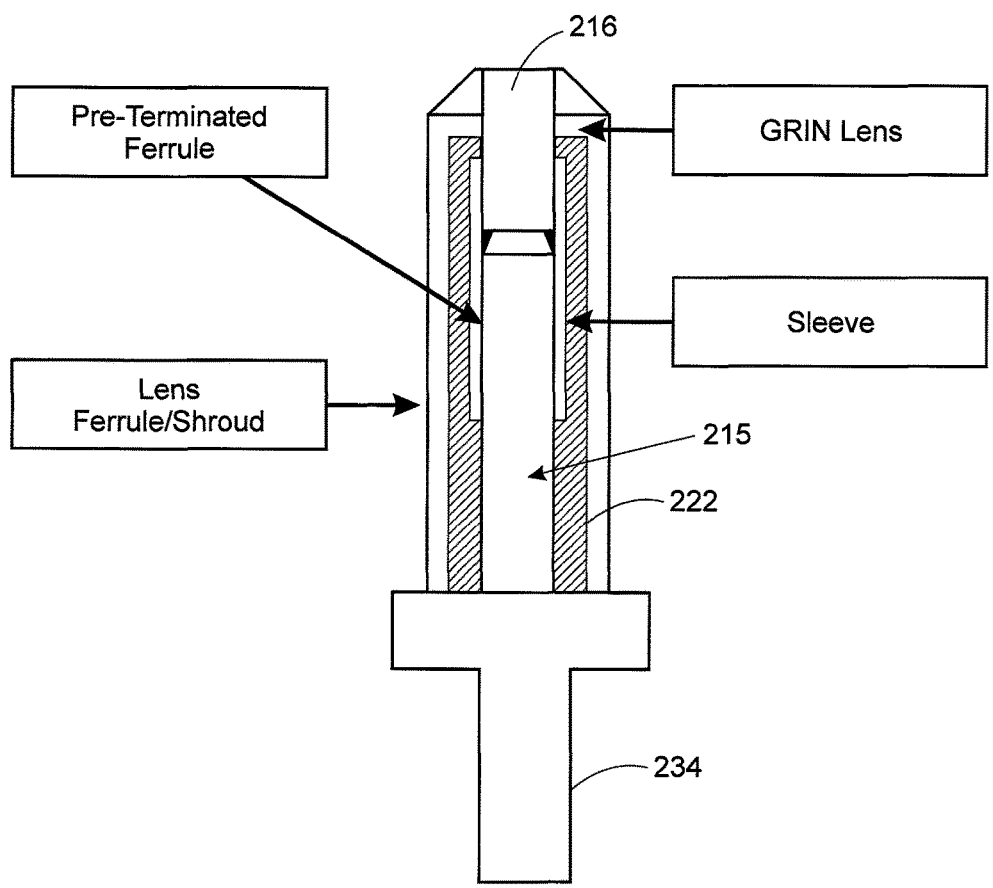
FIG. 6B is similar to FIG. 6A but shown with an exemplary front connector body.
Figure 7A:
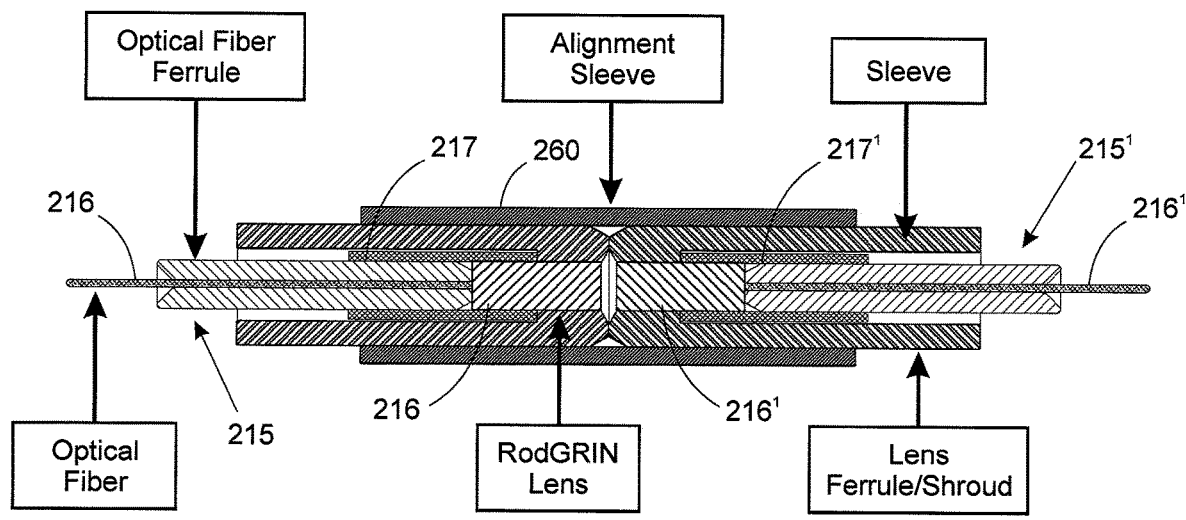
FIG. 7A is a cross sectional view of a mated pair of the expanded beam connectors by way of an alignment sleeve, in accordance with a second embodiment of the invention, shown with the connector body removed.
Figure 7B:
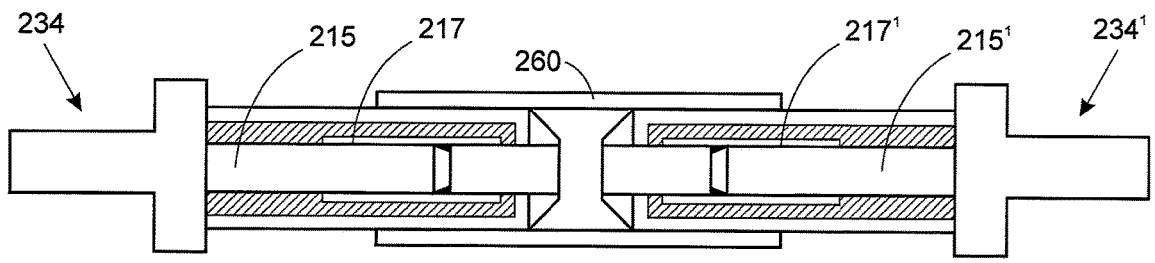
FIG. 7B is similar to FIG. 7A but shown with an exemplary front connector body

The second embodiment of the invention is illustrated in FIGS. 5-7. As mentioned above, in this embodiment, the outer ferrule diameter is used as the primary alignment feature between the termini, as discussed above. FIGS. 5, 6A and 7A illustrate a second embodiment of the invention with the rear body removed. FIGS. 6B and 7B illustrate the second embodiment of the invention with an exemplary one piece rear body. The second embodiment can also be implemented with other rear bodies, such as the two piece body discussed above.

The second embodiment of the expanded beam fiber optic terminus in accordance with the present invention is generally identified with the reference numeral 210. The expanded beam fiber optic terminus 210 includes an optical fiber ferrule 212 for carrying an optical fiber 214 forming a terminus 215. In accordance with an important aspect of the invention, the expanded beam fiber optic terminus 210 includes a GRIN lens 216.

The optical fiber ferrule 212 is formed in a generally cylindrical shape. A central longitudinal feed through whole 220 is formed in the center of the optical fiber ferrule 212 for receiving an optical fiber 214. The optical fiber 214 is secured to the optical fiber ferrule 212, as discussed above forming a terminus 215.

The optical fiber ferrule 212 is formed with the same outer diameter as the GRIN lens 216. In this embodiment, an alignment sleeve 217 is used to optically align the terminus 215 and the GRIN lens 216. The outer diameters of the optical fiber ferrule 212 and the GRIN lens 216 are formed to be slightly larger than the inner diameter of the alignment sleeve 217. As such, the optical fiber ferrule 212 and the GRIN lens 116 may be press fit into the lens ferrule 222 and held in place by friction. Alternatively, the GRIN lens can be secured by way of an adhesive.

The outer lens ferrule 222 is formed as a cylindrical member formed with a centrally located longitudinal through hole 224. The combination of the GRIN lens 216, the terminus 215 and the end of the alignment sleeve 217 is press fit into the through hole 224.

As best shown in FIG. 6A, the outer lens ferrule 222 is formed with an annular shoulder 128. Similar to the embodiment discussed above, the GRIN lens 216 is recessed from the shoulder 228 to allow for a gap 204, as discussed above.

FIGS. 7A and 7B illustrated a mated pair of fiber optic termini in accordance with the present invention. FIGS. 6B and 7B illustrate the connectors with an exemplary one piece rear body In this embodiment, the mating termini 215 and 215' are aligned by way of an alignment sleeve, 260, as discussed above.

Third Embodiment

The third embodiment is illustrated in FIGS. 8-10. The third embodiment is similar to the second embodiment in that the GRIN lens is aligned to the outer ferrule using an alignment sleeve. This design differs from the previous two because the termini are aligned with the alignment sleeve capturing the opposite end of the GRIN lenses as shown in FIGS. 9 and 10). The outer ferrule design is similar to the second as the GRIN lens is aligned to the ferrule using an alignment sleeve.

The third embodiment of the expanded beam fiber optic terminus in accordance with the present invention is generally identified with the reference numeral 310. The expanded beam fiber optic terminus 310 includes an optical fiber ferrule 312 for carrying an optical fiber 314 forming a terminus 315. In accordance with an important aspect of the invention, the expanded beam fiber optic terminus 310 includes a GRIN lens 316.

The optical fiber ferrule 312 is formed in a generally cylindrical shape. A central longitudinal feed through whole 320 is formed in the center of the optical fiber ferrule 312 for receiving an optical fiber 314. The optical fiber 314 is secured to the optical fiber ferrule 312, as discussed above forming a terminus 315.

The optical fiber ferrule 312 is formed with the same outer diameter as the GRIN lens 316. In this embodiment, an alignment sleeve 317 is used to optically align the terminus 315 and the GRIN lens 316. The outer diameters of the optical fiber ferrule 312 and the GRIN lens 316 are formed to be slightly larger than the inner diameter of the alignment sleeve 317. As such, the optical fiber ferrule 312 and the GRIN lens 316 are press fit into the lens ferrule 322 and are thus held in place by friction or alternatively secured with an adhesive.

The outer lens ferrule 322 is formed as a cylindrical member formed with a centrally located longitudinal through hole 324. The GRIN lens 316 is juxtaposed in one end of the alignment sleeve 317 and the terminus is juxtaposed on the other end. The alignment sleeve 317 is then press fit into the through hole 324. In this embodiment, the GRIN lens 316 extends outwardly from the end of the outer ferrule 322, as shown in FIGS. 9 and 10. In this embodiment, an internal shoulder (not shown) is used to limit axial movement of the alignment sleeve 317 within the though hole 324 so that the GRIN lens extends outwardly from the outer ferrule 322 by a predetermined amount.

FIGS. 9 and 10 illustrate a mated pair of fiber optic connectors in accordance with the present invention. In this embodiment, the mating termini 315 and 315' are aligned by way of an alignment sleeve 360, as discussed above. The spacing between the lenses of the mating termini would be maintained by the location of the termini with in the fiber optic connectors.

Obviously, many modifications and variations of the present invention are possible in light of the above teachings. Thus, it is to be understood that, within the scope of the appended claims, the invention may be practiced otherwise than as specifically described above.

We claim:

1. A fiber optic expanded beam connector assembly comprising:
   a pair of physical contact connector bodies defining a pin connector body and a socket connector body, each connector body having at least one bore sized to receive physical contact fiber optic assemblies;
   at least one expanded beam assembly comprising:
   an optical fiber;
   an optical fiber ferrule for terminating said optical fiber forming an optical fiber ferrule assembly having an outer diameter;
   a lens formed with the same outer diameter as said optical fiber ferrule assembly; and
   a lens ferrule for receiving and aligning said lens and said optical fiber assembly forming a lens ferrule assembly; and
   an alignment sleeve for receiving said lens ferrule assemblies and aligning said lens ferrule assemblies in said pin and socket connector bodies, said alignment sleeve having outer diameter sized to be received in said bores in said pin and socket connector bodies as direct replacements for said physical contact fiber optic assemblies; wherein said pin and socket connector bodies are connected together forming a fiber optic expanded beam connector assembly.

2. The fiber optic expanded beam connector assembly as recited in claim 1, wherein alignment sleeve is press fit in said bore.

3. The fiber optic expanded beam connector assembly as recited in claim 1, wherein said outer diameter of said alignment sleeve is bonded in said bore.

4. The fiber optic expanded beam connector assembly as recited in claim 1, wherein said lens is a graded refractive index lens.

5. The fiber optic expanded beam connector assembly as recited in claim 1, wherein said lens is a spherical lens.

6. A method for converting a physical contact type fiber optic connector assembly to an expanded beam connector assembly, wherein said physical contact type fiber optic connector assemblies include pin and socket connector bodies, each connector body having at least one bore with a physical contact fiber optic assembly installed therein, the method comprising the steps of:
(a) removing said physical contact type fiber optic assemblies from said bores in said connector bodies; and
(b) replacing said physical contact fiber optic assemblies in said bores in said connector bodies expanded beam fiber optic assemblies sized to be received in said bores in said connector bodies as direct replacements for said physical contact fiber optic assemblies.

7. The fiber optic expanded beam connector assembly as recited in claim 1, wherein said connector body has multiple bores for receiving multiple expanded beam assemblies.

8. A fiber optic expanded beam terminus assembly formed to replace an existing physical contact terminus assembly, said physical contact terminus assembly configured to enable an optical fiber from a socket connector body to make physical contact with an optical fiber of a pin connector within its respective physical contact terminus connector body, said physical contact connector body configured with at least one bore, said at least one bore dimensioned to receive fiber optic physical contact fiber optic termini, the fiber optic expanded beam terminus assembly comprising:
one or more expanded beam fiber optic termini, each of said expanded beam fiber optic termini comprising:
an optical fiber ferrule assembly having an optical fiber terminated therewithin;
a lens; and
a lens ferrule for aligning said optical ferrule assembly and said lens forming an expanded beam assembly;
said lens ferrule assembly expanded beam assembly formed with substantially the same outer diameter of said bores of said physical contact fiber optic connector body, to enable a physical contact connector assembly to be converted to a fiber optic expanded beam connector assembly.

9. A method for converting physical contact fiber optic physical contact fiber optic termini connector assemblies to expanded beam fiber optic connector assemblies having expanded beam fiber optic termini wherein said physical contact assembly is configured to enable an optical fiber from a socket connector body to make physical contact with an optical fiber of a pin connector, the method comprising the steps of:
(a) removing said physical contact fiber optic termini assembly from said existing connector assembly; and
(b) installing expanded beam fiber optic termini assembly and a lens into the said existing connector body.

* * * * *